(12) United States Patent
Watson

(10) Patent No.: US 7,057,503 B2
(45) Date of Patent: Jun. 6, 2006

(54) VEHICLE ROLLOVER DETECTION SYSTEM

(75) Inventor: W. Todd Watson, Belleville, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 63 days.

(21) Appl. No.: 10/391,943

(22) Filed: Mar. 19, 2003

(65) Prior Publication Data

US 2003/0182041 A1  Sep. 25, 2003

Related U.S. Application Data

(60) Provisional application No. 60/366,148, filed on Mar. 19, 2002.

(51) Int. Cl.
*B60Q 1/00* (2006.01)

(52) U.S. Cl. .......................................... 340/440; 701/45

(58) Field of Classification Search ................. 340/440; 701/82, 80, 90, 91, 71, 72, 45
See application file for complete search history.

(56) References Cited

U.S. PATENT DOCUMENTS

| | | | |
|---|---|---|---|
| 3,719,246 A | 3/1973 | Bott ............................ 180/103 |
| 3,897,846 A * | 8/1975 | Inoue ........................... 180/422 |
| 3,899,028 A | 8/1975 | Morris et al. ................. 172/4.5 |
| 4,038,876 A | 8/1977 | Morris .......................... 73/432 |
| 4,470,124 A | 9/1984 | Tagami et al. ............... 364/571 |
| 4,592,565 A | 6/1986 | Eagle ........................... 280/432 |
| 4,691,798 A | 9/1987 | Engelbach .................... 180/209 |
| 5,065,612 A | 11/1991 | Ooka et al. ........................ 73/1 |
| 5,115,238 A | 5/1992 | Shimizu et al. .............. 340/988 |
| 5,125,472 A | 6/1992 | Hara ............................ 180/271 |
| 5,172,323 A | 12/1992 | Schmidt ....................... 364/453 |
| 5,203,600 A | 4/1993 | Watanabe et al. ............ 296/68.1 |
| 5,218,771 A | 6/1993 | Redford ......................... 33/366 |
| 5,233,213 A | 8/1993 | Marek .......................... 257/415 |
| 5,261,506 A | 11/1993 | Jost .............................. 180/282 |
| 5,270,959 A | 12/1993 | Matsuzaki et al. ....... 364/571.02 |

(Continued)

FOREIGN PATENT DOCUMENTS

JP  05-317668  6/1995

(Continued)

OTHER PUBLICATIONS

U.S. Appl. No. 10/392,072, W. Todd Watson, *Vehicle Rollover Detection System*, Filed on Mar. 19, 2003.

(Continued)

*Primary Examiner*—Jeffery Hofsass
*Assistant Examiner*—Eric Blount
(74) *Attorney, Agent, or Firm*—Raggio & Dinnin, P.C.

(57) ABSTRACT

A roll angular velocity sensor and a lateral velocity sensor are operatively coupled to a processor, which generates a signal for controlling a safety restraint system responsive to measures of roll angular velocity and lateral velocity. In one embodiment, the processor delays or inhibits the deployment of the safety restraint system responsive to a measure responsive to the measure of lateral velocity, either alone or in combination with a measure of longitudinal velocity. In another embodiment, a deployment threshold is responsive to the measure of lateral velocity. The lateral velocity may be measured by a lateral velocity sensor, or estimated responsive to measures of lateral acceleration, vehicle turn radius, and either longitudinal velocity or yaw angular velocity, wherein the turn radius is estimated from either a measure of steering angle, a measure of front tire angle, or measures of forward velocity from separate front wheel speed sensors.

26 Claims, 15 Drawing Sheets

U.S. PATENT DOCUMENTS

| | | | | |
|---|---|---|---|---|
| 5,337,238 | A | 8/1994 | Gioutsos et al. | 364/424.05 |
| 5,359,515 | A | 10/1994 | Weller et al. | 364/424.05 |
| 5,363,302 | A | 11/1994 | Allen et al. | 364/424.05 |
| 5,369,580 | A | 11/1994 | Monji et al. | 364/424.01 |
| 5,375,336 | A | 12/1994 | Nakamura | 33/324 |
| 5,413,378 | A | 5/1995 | Steffens, Jr. et al. | 280/735 |
| 5,451,094 | A | 9/1995 | Templin et al. | 297/216.17 |
| 5,492,368 | A | 2/1996 | Pywell et al. | 280/806 |
| 5,508,918 | A | 4/1996 | Gioutsos | 364/424.05 |
| 5,573,269 | A | 11/1996 | Gentry et al. | 280/735 |
| 5,590,736 | A | 1/1997 | Morris et al. | 180/282 |
| 5,602,734 | A | 2/1997 | Kithil | 364/424.055 |
| 5,610,575 | A | 3/1997 | Gioutsos | 340/429 |
| 5,626,359 | A | 5/1997 | Steffens, Jr. et al. | 280/735 |
| 5,646,454 | A | 7/1997 | Mattes et al. | 307/10.1 |
| 5,673,932 | A | 10/1997 | Nitschke et al. | 280/735 |
| 5,684,336 | A | 11/1997 | McCurdy | 307/10.1 |
| 5,684,701 | A | 11/1997 | Breed | 364/424.055 |
| 5,699,256 | A | 12/1997 | Shibuya et al. | 364/453 |
| 5,742,916 | A | 4/1998 | Bischoff et al. | 701/45 |
| 5,755,978 | A | 5/1998 | Newell et al. | 216/33 |
| 5,796,002 | A | 8/1998 | Layton | 73/504.16 |
| 5,825,284 | A | 10/1998 | Dunwoody | 340/440 |
| 5,864,768 | A | 1/1999 | Bieber et al. | 701/38 |
| 5,890,084 | A | 3/1999 | Halasz et al. | 701/45 |
| 5,948,027 | A | 9/1999 | Oliver, Jr. et al. | 701/37 |
| 5,948,028 | A | 9/1999 | Raad et al. | 701/37 |
| 5,977,653 | A | 11/1999 | Schmid et al. | 307/10.1 |
| 6,002,974 | A | 12/1999 | Schiffmann | 701/36 |
| 6,002,975 | A | 12/1999 | Schiffmann et al. | 701/36 |
| 6,036,225 | A | 3/2000 | Foo et al. | 280/735 |
| 6,038,495 | A | 3/2000 | Schiffmann | 701/1 |
| 6,047,229 | A | 4/2000 | Ishikawa | 701/50.414 |
| 6,055,472 | A * | 4/2000 | Breunig et al. | 701/45 |
| 6,065,558 | A | 5/2000 | Wielenga | 180/282 |
| 6,070,681 | A | 6/2000 | Catanzarite et al. | 180/89.15 |
| 6,076,027 | A | 6/2000 | Raad et al. | 701/38 |
| 6,095,554 | A | 8/2000 | Foo et al. | 280/735 |
| 6,104,284 | A | 8/2000 | Otsuka | 340/440 |
| 6,113,138 | A | 9/2000 | Hermann et al. | 280/735 |
| 6,141,604 | A * | 10/2000 | Mattes et al. | 701/1 |
| 6,157,295 | A | 12/2000 | Steiner et al. | 340/440 |
| 6,169,946 | B1 | 1/2001 | Griessbach | 701/45 |
| 6,170,594 | B1 | 1/2001 | Gilbert | 180/282 |
| 6,178,368 | B1 * | 1/2001 | Otake | 701/70 |
| 6,186,539 | B1 | 2/2001 | Foo et al. | 280/735 |
| 6,192,305 | B1 | 2/2001 | Schiffmann | 701/45 |
| 6,212,455 | B1 | 4/2001 | Weaver | 701/45 |
| 6,225,894 | B1 | 5/2001 | Kyrtsos | 340/440 |
| 6,259,982 | B1 | 7/2001 | Williams et al. | 701/38 |
| 6,262,658 | B1 | 7/2001 | O'Connor | 340/440 |
| 6,263,261 | B1 | 7/2001 | Brown et al. | 701/1 |
| 6,264,212 | B1 | 7/2001 | Timoney | 280/5.51 |
| 6,282,474 | B1 | 8/2001 | Chou et al. | 701/45 |
| 6,292,759 | B1 | 9/2001 | Schiffmann | 702/151 |
| 6,301,536 | B1 | 10/2001 | Vaessen et al. | 701/45 |
| 6,315,074 | B1 | 11/2001 | Achhammer et al. | 180/282 |
| 6,332,104 | B1 | 12/2001 | Brown et al. | 701/1 |
| 6,341,252 | B1 | 1/2002 | Foo et al. | 701/45 |
| 6,390,498 | B1 | 5/2002 | Francis et al. | 280/735 |
| 6,421,592 | B1 | 7/2002 | Bargman et al. | 701/45 |
| 6,438,463 | B1 | 8/2002 | Tobaru et al. | 701/1 |
| 6,477,480 | B1 * | 11/2002 | Tseng et al. | 702/142 |
| 6,529,811 | B1 | 3/2003 | Watson et al. | 701/45 |
| 6,618,656 | B1 * | 9/2003 | Kueblbeck et al. | 701/45 |
| 6,631,317 | B1 * | 10/2003 | Lu et al. | 701/45 |
| 6,654,671 | B1 * | 11/2003 | Schubert | 701/1 |
| 2001/0029438 | A1 | 10/2001 | Tobaru et al. | 702/151 |
| 2001/0038202 | A1 | 11/2001 | Tobaru et al. | 280/805 |
| 2001/0048215 | A1 | 12/2001 | Breed et al. | 280/728.1 |
| 2002/0166710 | A1 | 11/2002 | Breed | 180/282 |
| 2002/0173882 | A1 | 11/2002 | Tobaru et al. | 701/1 |

FOREIGN PATENT DOCUMENTS

| | | |
|---|---|---|
| JP | 07-164985 | 6/1995 |

OTHER PUBLICATIONS

"Gyrostar Piezoelectric Vibrating Gyroscope," ENV-05H-02 Series, Murata.

Z. Zurong and S. Cunli, "Principle and Application of a QCW-1A Controllability-Stability Tester for Automobiles," SAE Paper #931973, Seventh International Pacific Conference and Exposition on Automotive Engineering, Phoenix, Arizona, Nov. 15-19, 1993.

A. G. Nalecz; A. C. Bindemann; and C. Bare, "Sensitivity Analysis of Vehicle Tripped Rollover Model", Report DOT HS 807 300, NHTSA, Jul., 1988.

W.R. Garrott, "Rollover Research Activities at the Vehicle Research and Test Center—Frequency Response Testing", Report DOT HS 807 993, NHTSA, Jun., 1992.

W.R. Garrott; J.G. Howe; and G. Forkenbrock, "An Experimental Examination of Selected Maneuvers That May Induce On-Road Untripped, Light Vehicle Rollover—Phase II of NHTSA's 199701998 Vehicle Rollover Research Program", Report VRTC-86-0421, NHTSA, Jul., 1999.

PCT International Search Report In International Application No. PCT/US03/08358, 3 pages. (International counterpart to U.S. Appl. No. 10/391,943).

* cited by examiner

Fig. 8a

| | MEASURES ALGORITHM (xxx.1) | ENERGY ALGORITHM (xxx.2) |
|---|---|---|
| ONGOING_EVENT_FLAG (302) | ONGOING_MEASURES_EVENT_FLAG | ONGOING_ENERGY_EVENT_FLAG |
| Entrance Criteria (306) | $\left\|\tilde{A}_y(t) - \tilde{A}_y^{Offset}(t)\right\| > A_y^{Thr-1}$ | a. $\left\|\tilde{A}_y(t) - \tilde{A}_y^{Offset}(t)\right\| > A_y^{Thr-1}$ OR<br>b. $\left\|\tilde{\omega}_x(t) - \tilde{\omega}_x^{Offset}(t)\right\| > \omega_x^{Thr-1}$ |
| Exit Criteria (322) | $\Delta t^M(n^M) > \Delta t_{max}^M$ | a. $\Delta t^E(n^E) > \Delta t_{max}^E$ OR<br>b1. $\Delta t^E(n^E) > \Delta t_{min}^E$ AND<br>b2. $\Delta t^E(n^E) - \Delta t^{E*} > \Delta t_{Event}^E$ |
| Algorithm Initialization (310) | a. $n^M = 0$<br>b. $t^M(-1) = t^M(0) = t$<br>c. $\Delta t^M(0) = 0$<br>d. $\theta^M(-1) = 0$<br>e. $R(-1) = 0$ | a. $n^E = 0$<br>b. $t^E(-1) = t^E(0) = t$<br>c. $\Delta t^E(0) = 0$<br>d. $\theta^E(-1) = 0$<br>e. $n_\omega^E = 0$<br>f. $\Delta t^{E*} = 0$ |
| Measure of Time (312) | a. $n^M$ ++<br>b. $t^M(n^M) = t$<br>c. Time since algorithm entrance<br>$\Delta t^M(n^M) = t^M(n^M) - t^M(0)$ | a. $n^E$ ++<br>b. $t^E(n^E) = t$<br>c. Time since algorithm entrance<br>$\Delta t^E(n^E) = t^E(n^E) - t^E(0)$ |
| Safing Criteria (200) | a. $\left\|\tilde{A}_y(t) - \tilde{A}_y^{Offset}(t)\right\| > A_y^{Thr-3}$ for any t during either a Measures Event or an Energy Event (ACCELERATION_SAFING_EVENT_FLAG) AND<br>b. $\left\|\tilde{\omega}_x(t) - \tilde{\omega}_x^{Offset}(t)\right\| > \omega_x^{Thr-3}$ for any t during either a Measures Event or an Energy Event (ROLL_SAFING_EVENT_FLAG) | |

Fig. 8b

| | MEASURES ALGORITHM (xxx.1) | ENERGY ALGORITHM (xxx.2) |
|---|---|---|
| Algorithm Calculations (326) | a. Sample interval $$dt = t^M(n^M) - t^M(n^M - 1)$$ b. Acceleration sampling and offset compensation $$\tilde{A}'_y(n^M) = \tilde{A}_y(t) - \tilde{A}_y^{Offset}(t)$$ c. Roll rate sampling and offset compensation $$\tilde{\omega}'_x(n^M) = \tilde{\omega}_x(t) - \tilde{\omega}_x^{Offset}(t)$$ d. Roll angle from integration of roll rate $$\theta^M(n^M) = \theta^M(n^M - 1) + \tilde{\omega}'_x(n^M) \cdot dt$$ e. Force Measure $$F^* = \tilde{A}'_y(n^M)$$ f. Rotational Kinetic Energy Measure $$KE^* = \tilde{\omega}'^2_x(n^M)$$ g. Potential Energy Measure $$PE^* = sign(\tilde{\omega}'_x(n^M)) \cdot \theta_0 + \theta^M(n^M)$$ h. Measure Function $$R(n^M) = R(n^M - 1) \cdot (1 - \frac{\Delta t^M}{\tau}) + F^* \cdot KE^* \cdot PE^*$$ i. Figure of Merit $$FOM(n^M) = |R(n^M)| \cdot (|R(n^M)| - |R(n^M - 1)|)$$ | a. Sample interval $$dt = t^E(n^E) - t^E(n^E - 1)$$ b. Acceleration sampling and offset compensation $$\tilde{A}'_y(n^E) = \tilde{A}_y(t) - \tilde{A}_y^{Offset}(t)$$ c. Roll rate sampling and offset compensation $$\tilde{\omega}'_x(n^E) = \tilde{\omega}_x(t) - \tilde{\omega}_x^{Offset}(t)$$ d. Roll angle from integration of roll rate $$\theta^E(n^E) = \theta^E(n^E - 1) + \tilde{\omega}'_x(n^E) \cdot dt$$ e. Compensation for roll oscillation effect if $sign(\tilde{\omega}'_x(n^E)) \neq sign(\tilde{\omega}'_x(n^E - 1))$ then $$\theta^E(n^E) = \theta^E(n^E - 1) \cdot MAX\left(\frac{1024 - (n^E - n_\omega^E)}{1024}, 0.5\right)$$ $$n_\omega^E = n^E$$ f. Exit Criteria Basis if $|\tilde{A}'_y(n^E)| > A_y^{Thr\_1}$ OR $|\tilde{\omega}'_x(n^E)| > \omega_x^{Thr\_1}$ then $\Delta t^{E^*} = \Delta t^E$ |

Fig. 8c

| | MEASURES ALGORITHM (xxx.1) | ENERGY ALGORITHM (xxx.2) |
|---|---|---|
| Algorithm Detection Criteria (330) | a. Figure of Merit Threshold $$FOM^{Thr}(\Delta t^M) = A \cdot \Delta t^M + B$$ b1. $\Delta t^M_{min} \leq \Delta t^M \leq \Delta t^M_{max}$ AND<br>b2. $FOM(n^M) > FOM^{Thr}(\Delta t^M)$ AND<br>b3. $\|FOM(n^M)\| > \|FOM(n^M - 1)\|$ AND<br>b4. $\|FOM(n^M)\| > \|FOM(n^M - m)\|$ AND<br>b5. $\|A'_y(n^M)\| > A_y^{Thr\_2}$ AND<br>b6. $\|\tilde{\omega}'_x(n^M)\| > \omega^{Thr\_2}$ | a. Identification of Energy Threshold Segment $$k = k \ni \theta_k \leq \theta^E < \theta_{k+1}$$ b. Distance from Energy Threshold Segment in phase space $$D(\tilde{\omega}'_x, \theta^E, n^E, k) = \frac{\left[(\omega_{k+1} - \omega_k) \cdot (\theta^E(n^E) - \theta_k) - (\theta_{k+1} - \theta_k) \cdot (\|\tilde{\omega}'_x(n^E)\| - \omega_k)\right]}{\sqrt{(\theta_{k+1} - \theta_k)^2 + (\omega_{k+1} - \omega_k)^2}}$$ c. Slope of trajectory in phase space $$Slope(n^E) = \frac{\tilde{\omega}'_x(n^E) - \tilde{\omega}'_x(n^E - 1)}{\theta^E(n^E) - \theta^E(n^E - 1)}$$ d. $\beta = \tan^{-1}\left(Slope(n^E) \cdot \frac{180}{\pi}\right)$<br>e1. $\beta^{min} < \beta < \beta^{max}$ AND<br>e2. $\|\tilde{\omega}'_x(n^E)\| - \|\tilde{\omega}'_x(n^E - 1)\| > 0$ AND<br>e3. $D(\tilde{\omega}'_x, \theta^E, n^E, k) < 0$ AND<br>e4. $\|\theta^E\| > \theta^{Thr}$<br>OR<br>f1. $D(\tilde{\omega}'_x, \theta^E, n^E, k) < D^{Thr}$ AND<br>f2. $\|\theta^E\| > \theta^{Thr}$ |

Fig. 9a

| Step | Parameter | Value | Algorithm |
|---|---|---|---|
| Data Acquisition & Preprocessing (150) | $dt$ | 0.4 msec | Data Acquisition |
| | $A_Y^{max}$ | Min(20 g , |range of accelerometer|) | Clipping |
| | $\omega_x^{max}$ | Min(300 deg/sec, |range of angular velocity sensor|) | |
| | $T_{Avg\_Offset}$ | 4 sec | Filtering |
| | $T_{Avg}$ | 12.8 msec | |
| Entrance Criteria (306) | $A_Y^{Thr\_1}$ | 1.4 g | Measures & Energy |
| | $\omega^{Thr\_1}$ | 19 deg/sec | Energy |
| Exit Criteria (322) | $\Delta t_{max}^M$ | 165 msec | Measures |
| | $\Delta t_{min}^E$ | 4 sec | Energy |
| | $\Delta t_{max}^E$ | 12 sec | |
| | $\Delta t_{Event}^E$ | 2 sec | |
| Algorithm Calculations (326) | $\theta_0$ | 0.1 deg | Measures |
| | $\tau$ | 400 sec | |
| Algorithm Detection Criteria (330) | $A$ | 6.46E11 (g²deg⁶/ms/s⁴) | 40 ms < t < 96 ms<br>2.59E11 (g²deg⁶/ms/s⁴) | 96 ms < t < 165 ms | Measures |
| | $B$ | -2.34E13 (g²deg⁶/ s⁴) | 40 ms < t < 96 ms<br>-1.36E13 (g²deg⁶/ s⁴) | 96 ms < t < 165 ms | |
| | $\Delta t_{min}^M$ | 40 msec | |
| | $\Delta t_{max}^M$ | 165 msec | |
| | $m$ | 6 | |
| | $A_Y^{Thr\_2}$ | 0.7 g | |
| | $\omega^{Thr\_2}$ | 50 deg/sec | |
| | $\theta_k$ | Experimentally Determined | |
| | $\omega_k$ | Experimentally Determined | |
| | $\beta^{min}$ | 75 deg | Energy |
| | $\beta^{max}$ | 90 deg | |
| | $D^{Thr}$ | $-2.5 \sqrt{deg^2 + (deg/sec)^2}$ | |
| | $\theta^{Thr}$ | 10 deg | |

Fig. 9b

| Step | Parameter | Value | Algorithm |
|---|---|---|---|
| Sensor Recalibration Criteria (400) | $\omega_x^{Thr\_4}$ | 0.8 * max range of roll gyro measurement (e.g. $\omega_x^{Thr\_4}$ = 250 deg/sec) | Measures & Energy |
| | $\Delta t_\omega^{max}$ | 0.5 sec | |
| | $\theta^{Thr}$ | 180 deg | |
| | $\Delta t_\theta^{max}$ | 0.5 sec | |
| | $A_y^{Thr\_4}$ | 0.8 * max range of accelerometer measurement (e.g. $A_y^{Thr\_4}$ = 15 g) | |
| | $\Delta t_A^{max}$ | 3 sec | |
| Sensor Recalibration Criteria (324) | p | 3 | Energy |
| Safing Criteria (200) | $A_Y^{Thr\_3}$ | 1.9 g | Measures & Energy |
| | $\omega^{Thr\_3}$ | 50 deg/sec | |

Fig. 10

| Test | A | B | C | D |
|---|---|---|---|---|
| Type | Corkscrew | Corkscrew | Deceleration Sled | Deceleration Sled |
| Initial Speed MPH | 33 | 28 | 14 | 17 |
| Avg. Deceleration g | | | 1.5 | 2.5 |
| Result | Roll | Non-Roll | Non-Roll | Roll |
| Energy Algorithm TTF (ms) | 537 | - | - | 594 |
| Measures Algorithm TTF (ms) | 855 | - | - | 98 |
| Safing Algorithm TTF (ms) | 846 | - | 43 | 26 |
| Head Closure (ms) | 905 | 800 | 216 | 196 |
| Maximum Roll Angle (deg) | - | 37 | 34 | - |

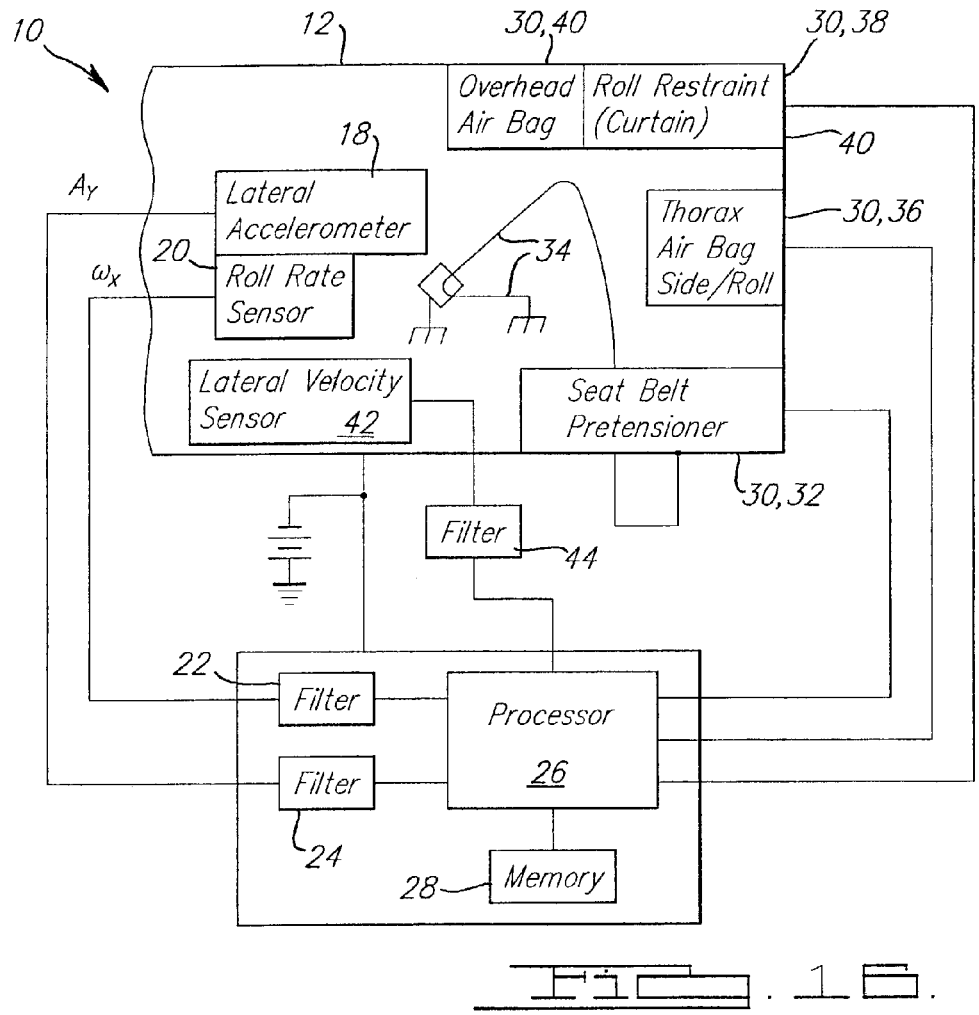
FIG. 16.
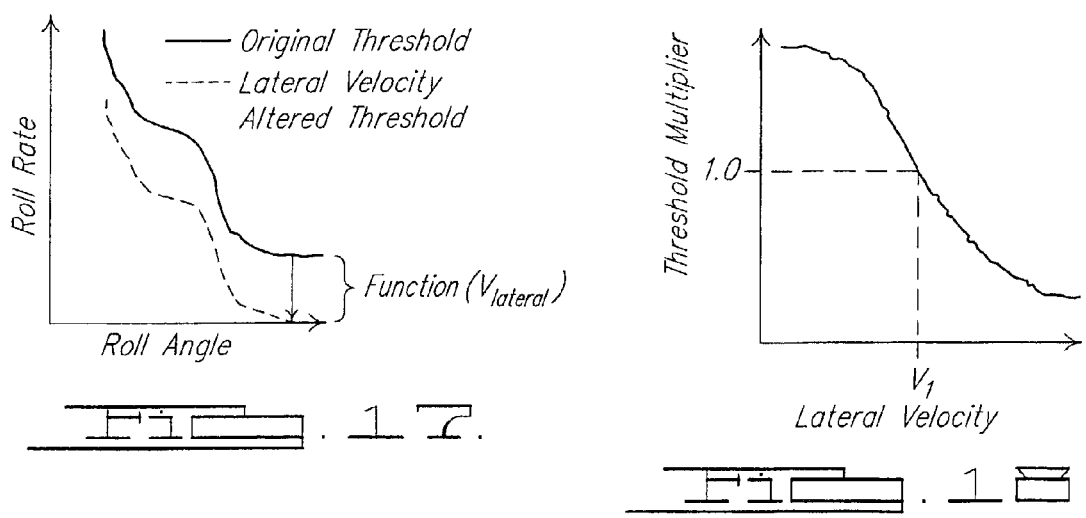
FIG. 17.
FIG. 18.

VEHICLE ROLLOVER DETECTION SYSTEM

CROSS-REFERENCE TO RELATED APPLICATIONS

The instant application claims the benefit of U.S. Provisional Application Ser. No. 60/366,148 filed on Mar. 19, 2002, which is incorporated herein by reference.

BRIEF DESCRIPTION OF THE DRAWINGS

In the accompanying drawings:

FIGS. 8a, 8b and 8c are tables that illustrate details of the rollover detection algorithm;

FIGS. 9a and 9b are tables that illustrate examples of values of parameters of the rollover detection algorithm;

FIG. 10 illustrates a table of conditions associated with various rollover events and non-rollover events;

FIG. 16 illustrates an embodiment of a rollover detection system comprising a lateral velocity sensor;

FIG. 17 illustrates an adjustment of a roll rate—roll angle deployment threshold responsive to a measure of lateral velocity; and FIG. 18 illustrates a threshold multiplier as a function of lateral velocity.

DESCRIPTION OF EMBODIMENT(S)

There exists a need for a vehicle rollover detection system that provides for discrimination of vehicle rollover sufficiently quickly to enable associated safety restraint actuators, e.g. seat belt pretensioners, air bags or roll curtains, to be deployed before an initial head contact with the interior of the vehicle, particularly for the types of rollovers resulting in relatively fast head closure times. For example, there are some roll events for which head closure may occur before it can be reliably determined from the physics of the roll event whether the vehicle will completely rollover. There further exists a need for a robust vehicle rollover detection system that provides for sufficiently fast discrimination of vehicle rollover responsive to either relatively slow or relatively fast rollover events.

Figures 1A, 1B:
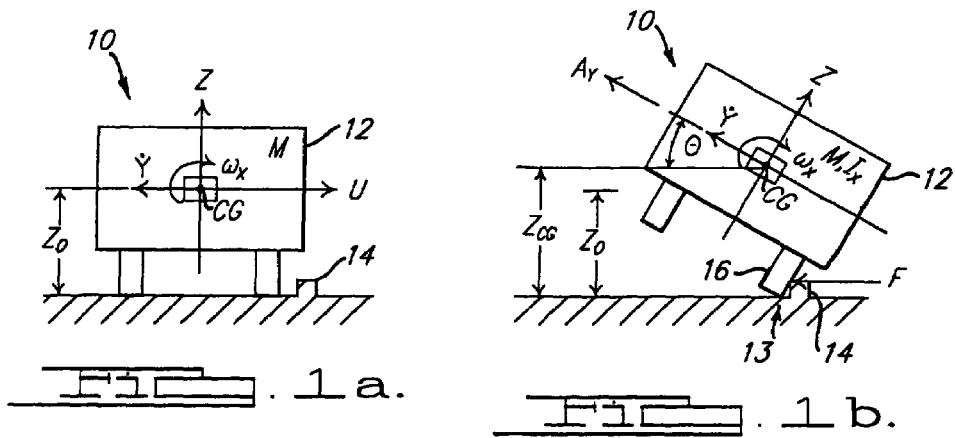
FIG. 1a illustrates a rear view of a vehicle prior to the initiation of a roll event.
FIG. 1b illustrates a rear view of a vehicle during a roll event.

Referring to FIG. 1a, a rollover detection system 10 is seen mounted in a vehicle 12. The vehicle 12 is shown with a local Cartesian coordinate system with the X-axis aligned with the vehicle's longitudinal axis—positive forward,—the Y-axis aligned with the vehicle's lateral axis—positive leftward,—and the Z-axis aligned with the vehicle's vertical axis—positive upward. The vehicle 12 has a mass M, and the associated center-of-gravity CG thereof is located at a height $Z_0$ above the ground. The vehicle 12 is shown sliding at a velocity U in the negative Y direction towards an obstruction 14.

Referring to FIG. 1b, upon one or more wheels 16 of the vehicle 12 engaging the obstruction 14, the resulting reaction force F therefrom causes the vehicle 12 to rotate about the X-axis relative to a trip point 13, at a time dependent angular velocity $\omega_x(t)$ causing a time dependent angular position $\theta(t)$, wherein the vehicle 12 has a moment-of-inertia $I_x$ about the associated axis of rotation that is parallel with the X-axis and intersecting the trip point 13. The rotation of the vehicle 12 increases the height $Z_{CG}$ of the center-of-gravity CG relative to the height $Z_0$ thereof prior to engagement with the obstruction 14, thereby increasing the potential energy $M \cdot g \cdot (Z_{CG} - Z_0)$ of the vehicle 12 relative to the pre-engagement position and orientation. Accordingly, the potential energy of the vehicle 12 is dependent upon the angular position $\theta$ thereof. Furthermore, with rotation, the vehicle 12 gains an angular kinetic energy of $$I_x \cdot \frac{\omega_x^2}{2}.$$

The reaction force F also causes a linear acceleration $$A = \frac{F}{M}$$

of the center-of-gravity CG, as indicated by the lateral acceleration component $A_y(t)$ along the local Y-axis.

Whereas FIGS. 1a and 1b illustrate a roll event caused by the impact of a sliding vehicle with an obstruction, it should be understood that roll events can be caused by other scenarios, e.g. a tire blowout followed by a subsequent engagement of the associated wheel rim with the ground. Accordingly, the rollover detection system 10 is not limited to a particular type of roll event.

Figure 2:
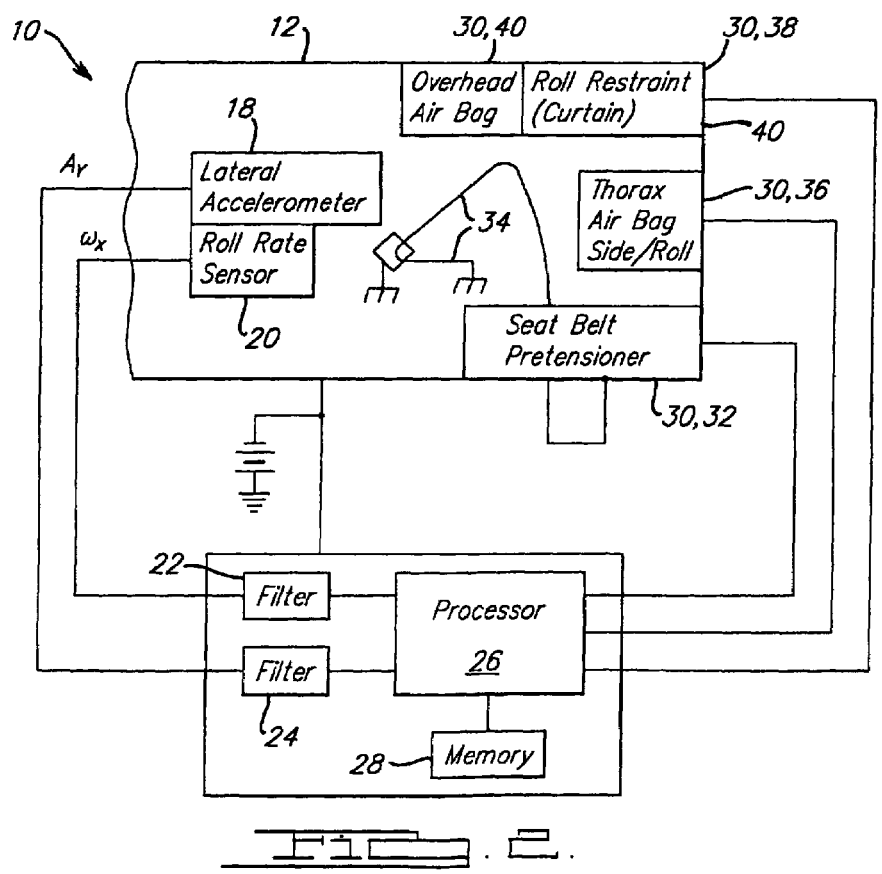
FIG. 2 illustrates a block diagram of a rollover detection system.

Referring to FIG. 2, the rollover detection system 10 comprises a lateral accelerometer 18 and an angular rate sensor 20, which are preferably, but not necessarily, mounted proximate to the center-of-gravity CG of the vehicle 12. The lateral accelerometer 18 is responsive to a time dependent lateral acceleration component $A_y(t)$ of acceleration along the local Y-axis. For example, the lateral accelerometer 18 may comprise an accelerometer, e.g. a micro-machined accelerometer having at least one axis of sensitivity, with an axis of sensitivity substantially aligned with the local Y-axis. The angular rate sensor 20, e.g. a gyroscope, is oriented so as to be responsive to a time-dependent component of angular velocity $\omega_x(t)$ about the local X-axis. The lateral accelerometer 18 and angular rate sensor 20 are operatively coupled to respective filters 22, 24 that filter the respective signals $A_y(t)$ and $\omega_x(t)$ for processing by a processor 26 having a memory 28. It should be understood that the filters 22, 24 can be either separate from or incorporated in the processor 26, and may be either analog or digital, or a combination thereof, as known to one of ordinary skill in the art. Moreover, the filters 22, 24 could be adapted as part of the respective lateral accelerometer 18 or angular rate sensor 20. The processor 26 processes the respective filtered $\tilde{A}_y(t)$ and $\tilde{\omega}_x(t)$ signals so as to discriminate whether or not the vehicle would be likely to roll over, and responsive thereto, to control the actuation of appropriate safety restraint actuators 30 so as to mitigate rollover induced injury to an occupant of the vehicle 12. For example, the processor 26 may comprise a digital computer, microprocessor or other programmable device, an analog processor, analog or a digital circuitry, or a combination thereof. Moreover, the safety restraint actuators 30 may include, but are not limited to, a seat belt pretensioner 32 operatively connected to a seat belt 34; a thorax air bag inflator 36 adapted to provide protection from both rollover and side-impact crashes; a roll curtain 38 adapted to deploy between the occupant and the side window 39 of the vehicle 12; or an overhead air bag inflator 40 adapted to deploy an air bag from the roof or headliner of the vehicle 12. Whereas FIG. 2 illustrates the safety restraint actuators 30 for one seating position of the vehicle 12, it should be understood that safety restraint actuators 30 may be provided at each seating position, and that the rollover detection system 10 can be adapted to control any or all of the safety restraint actuators 30 responsive to rollovers in any direction for which the associated safety restraint actuators 30 are adapted to mitigate occupant injury. Moreover, the particular set of safety restraint actuators 30 need not necessarily include all of those described hereinabove, or may include other types of safety restraint actuators 30 not described hereinabove.

Figures 3, 4:
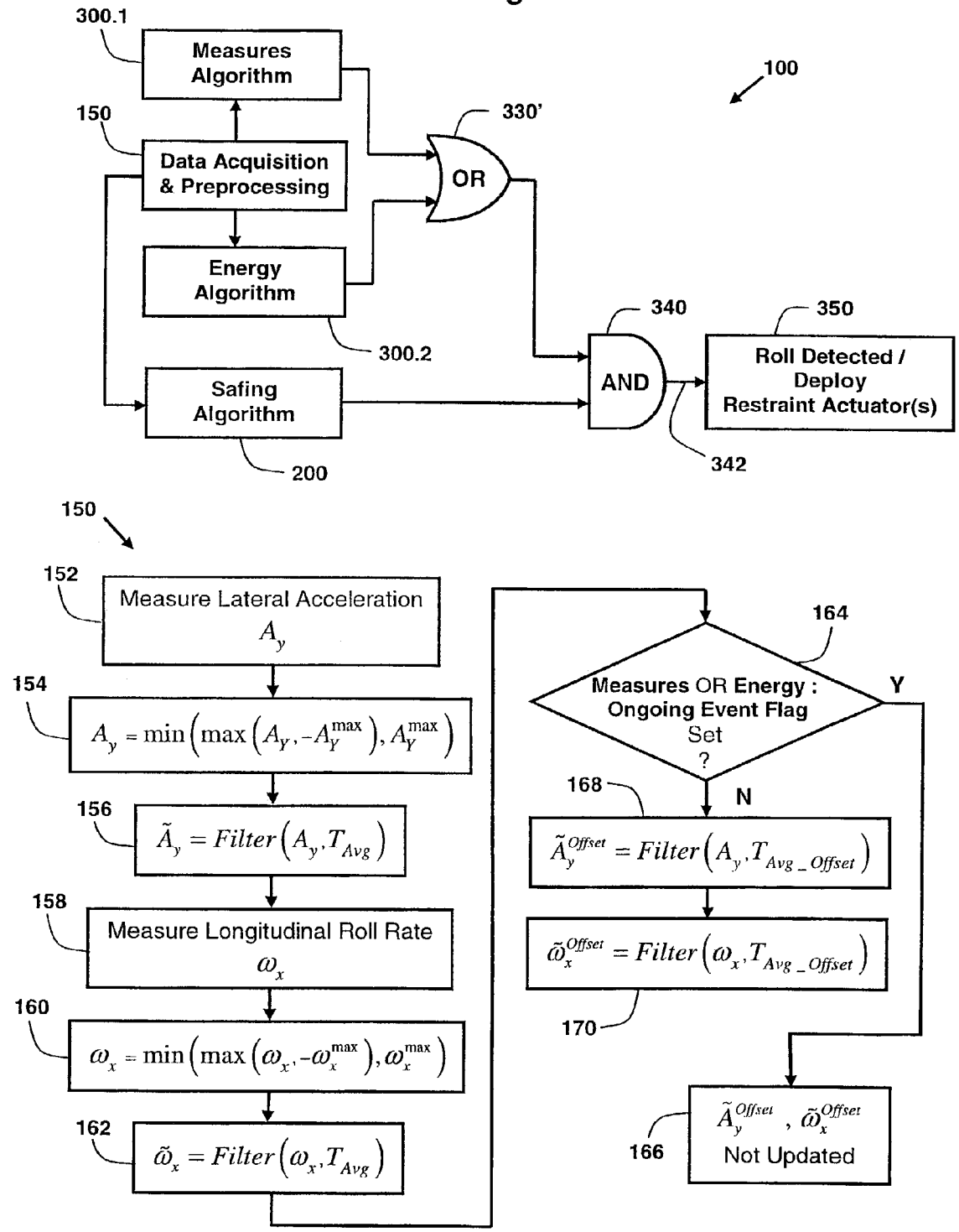
FIG. 3 illustrates a flow diagram of a rollover detection algorithm.
FIG. 4 illustrates a flow diagram of a data acquisition and preprocessing algorithm incorporated in the rollover detection algorithm.

Referring to FIG. 3, in accordance with one embodiment of a rollover detection algorithm 100 for detecting a vehicle rollover and controlling the actuation of one or more associated safety restraint actuators 30—e.g. in accordance with the apparatus illustrated in FIG. 2—comprises the combination of a data acquisition and preprocessing algorithm 150, a measures algorithm 300.1, an energy algorithm 300.2, a safing algorithm 200 and associated logic 330', 340 that generates a signal 342 that controls the actuation of the safety restraint actuator(s) 30 responsive thereto.

The measures algorithm 300.1 uses a heuristic, time-domain discrimination process to detect a rollover condition, and can be beneficial in shortening deployment times for most rollover events characterized by relatively fast head closure times (e.g. <250 msec) that are typically associated with larger lateral vehicle forces. The measures algorithm 300.1 utilizes both the filtered lateral acceleration component $\tilde{A}_y$ and filtered angular velocity $\tilde{\omega}_x$ signals to evaluate a function that is compared with a threshold, that along with other criteria, are used to make a deployment decision.

The energy algorithm 300.2 uses a phase-space discrimination process—based upon the physics associated with a vehicle rollover process—to detect a rollover condition, and can be beneficial in providing reliable deployment decisions for slower roll events that are caused primarily by vertical forces on the vehicle or by low level lateral forces on the vehicle 12. The energy algorithm 300.2 utilizes the filtered angular velocity $\tilde{\omega}_x$ signal to determine the roll state of the vehicle 12 and to compare the instantaneous total energy (rotational to kinetic and potential) thereof with that needed to cause the vehicle 12 to roll past an associated equilibrium position. The energy algorithm 300.2 utilizes both the filtered lateral acceleration component $\tilde{A}_y$ and filtered angular velocity $\tilde{\omega}_x$ signals in the associated entrance and exit criteria.

Whereas FIG. 3 illustrates the measures algorithm 300.1 and the energy algorithm 300.2 used in combination, it should be understood that this is not essential, and that either of the algorithms can be used alone. However, the combination of algorithms increases the robustness of the associated rollover detection system 10, because for some conditions, e.g. "curb-trip" conditions, the measures algorithm 300.1 can provide faster discrimination than the energy algorithm 300.2; whereas for other conditions, e.g. "corkscrew", "ramp" or "flip" conditions, the energy algorithm 300.2 can provide faster discrimination than the measures algorithm 300.1.

The measures algorithm 300.1 and energy algorithm 300.2 are independent of one another, although each utilizes common, filtered data from the data acquisition and preprocessing algorithm 150, i.e. a filtered lateral acceleration components $\tilde{A}_y$ and a filtered angular velocity $\tilde{\omega}_x$. Both the measures algorithm 300.1 and the energy algorithm 300.2 are characterized by associated entrance and exit criteria, wherein calculations associated with the respective algorithm are commenced if the respective associated entrance criteria is satisfied, and these calculations are terminated if the respective associated exit criteria is satisfied, and then reset if and when the entrance criteria are subsequently satisfied.

The safing algorithm 200 can improve the reliability of the rollover detection system 10 by providing an independent set of conditions, or safing criteria—dependent upon the filtered lateral acceleration components $\tilde{A}_y$ and/or filtered angular velocity $\tilde{\omega}_x$—that must be met in order to enable the deployment of the one or more associated safety restraint actuators 30. Both the measures algorithm 300.1 and the energy algorithm 300.2 are each "safed" by a common safing algorithm 200. Whereas the safing algorithm 200 provides for additional discrimination so as to mitigate against an undesirable actuation of the safety restraint actuators 30 responsive to non-rollover events, it should be understood that the safing algorithm 200 is not essential, and that either measures algorithm 300.1 or the energy algorithm 300.2 can be used alone, or in combination with one another, with or without the safing algorithm 200.

In the operation of the rollover detection algorithm 100, responsive to data from the data acquisition and preprocessing algorithm 150, if either the measures algorithm 300.1 OR 330' the energy algorithm 300.2 detects a vehicle rollover condition, AND 340 if the safing algorithm 200 determines that an associated independent safing condition is satisfied, then, in step (350), one or more safety restraint actuators 30 are deployed so as to mitigate injury to an associated occupant of the vehicle, that could result from the rollover event, whether or not the vehicle 12 actually rolls over.

The data acquisition and preprocessing algorithm 150, safing algorithm 200, measures algorithm 300.1, and energy algorithm 300.2 are described hereinbelow with reference to flow charts illustrated in FIGS. 3–7. FIG. 6 illustrates a flow chart of a general algorithmic structure of both the measures algorithm 300.1 and the energy algorithm 300.2, wherein particular details of the measures algorithm 300.1 and the energy algorithm 300.2 are provided in table format in FIGS. 8a–c. The algorithms are described mathematically, wherein parameters are used for application specific constants, and these parameters are listed in FIGS. 9a and 9b along with exemplary values for a particular type of vehicle. It should be understood that the parameters are generally adapted to a particular application, e.g. vehicle platform, and that the particular values of the parameters in FIGS. 9a and 9b are illustrative only, and should not be considered to limit the scope of the instant invention.

Referring to FIG. 4, the data acquisition and preprocessing algorithm 150 acquires a measurement of lateral acceleration component $A_y$ from the lateral accelerometer 18 in step (152), and acquires a measurement of longitudinal angular velocity $\omega_x$, or roll rate, from the angular rate sensor 20 in step (158). Data from more than 100 rollover tests has indicated that the angular velocity $\omega_x$ associated with a rollover generally ranges between ±300 degrees/second $$(\pm |\omega_x^{max}|)$$

and the lateral acceleration component $A_y(t)$ associated therewith generally ranges between $$\pm 20 \text{ g} (\pm |A_Y^{max}|).$$

Respective measurements of the lateral acceleration component $A_y(t)$ and the angular velocity $\omega_x$ that exceed these respective limits are respectively clipped threat in steps (154) and (160) respectively. For example, the value of an lateral acceleration component $A_y(t)$ measurement less that −20 g would be set in step (154) to −20 g, for the example of an associated range of ±20 g. The polarities of the lateral accelerometer 18 and the angular rate sensor 20 are set so that the corresponding polarities of angular velocity $\omega_x$ and the lateral acceleration component $A_y$ signals are the same as each other during a roll event. Generally, the level $$|A_Y^{max}|$$

for clipping signals from the lateral accelerometer 18 is set to the minimum of either 20 g or the range of the lateral accelerometer 18. Similarly, the level $$|\omega_x^{max}|$$

for clipping signals from the angular rate sensor 20 is set to the minimum of either 300 degrees/second or the range of the angular rate sensor 20.

The raw lateral acceleration component $A_y$ and angular velocity $\omega_x$ data from the lateral accelerometer 18 and the angular rate sensor 20 respectively are filtered by respective filters 22, 24 in steps (156) and (162) respectively, so as to respectively provide a filtered lateral acceleration component $\tilde{A}_y$ and a filtered angular velocity $\tilde{\omega}_x$. The use of filtered measurements is beneficial in avoiding a false entrance of the roll discrimination algorithm, and in improving the associated discrimination process by the measures algorithm 300.1 and the energy algorithm 300.2. The filters 22, 24 are, for example, moving average filters having a moving average window of $T_{Avg}$, e.g. between 10 and 15 milliseconds, so as to provide a suitable compromise between fast signal response and noise reduction. As an example, for a processor 26 that uniformly samples the angular velocity $\omega_x$ and lateral acceleration component $A_y$ signals—as is assumed hereinbelow—with a sampling rate of 2500 Hz (corresponding to a sample period dt=0.4 milliseconds) and a window of 12.8 milliseconds, a moving average for each signal would be calculated from the last 32 samples acquired. The individual samples of the moving average are typically uniformly weighted, but could alternately be non-uniformly weighted.

Generally, the lateral accelerometer 18 and the angular rate sensor 20 can exhibit offset and/or drift error (generally referred to herein as sensor offset error), which, unless otherwise compensated, can cause associated roll detection errors. The sensor offset errors are estimated by filtering the associated sensor measurements with associated filters having an effective cutoff frequency that is substantially lower—or, stated in another way, a effective filter time constant that is substantially greater—than the associated above-described moving-average filters that provide the filtered lateral acceleration component $\tilde{A}_y$ and the filtered angular velocity $\tilde{\omega}_x$. For example, the acceleration offset $$\tilde{A}_y^{Offset}$$

and the angular velocity offset $$\tilde{\omega}_x^{Offset}$$

are filtered from the associated raw measurements of angular velocity $\omega_x$ and lateral acceleration component $A_y$, respectively, by respective moving average filters in steps (168) and (170) respectively, each moving-average filter having an associated filter window of width $T_{Avg\_Offset}$, e.g. about 4 seconds. From step (164), the filtered values of acceleration offset $$\tilde{A}_y^{Offset}$$

and angular velocity offset $$\tilde{\omega}_x^{Offset}$$

are updated only if the neither the measures algorithm 300.1 nor the energy algorithm 300.2 have been entered, as indicated by neither associated ONGOING_EVENT_FLAGs—i.e. neither an ONGOING_MEASURES_EVENT_FLAG nor an ONGOING_ENERGY_EVENT_FLAG—being set. Accordingly, in step (166), the relatively long-term filtered values of acceleration offset $$\tilde{A}_y^{Offset}$$

and angular velocity offset $$\tilde{\omega}_x^{Offset}$$

are not updated during periods of time when the associated lateral acceleration component $A_y$ and angular velocity $\omega_x$ could be substantially different from the associated sensor offset values.

Whereas FIG. 4 illustrates the acquisition and processing of the lateral acceleration component $A_y$ before that of the angular velocity $\omega_x$, it should be understood that the relative order could be reversed, or these operations could be performed in parallel.

The measures algorithm 300.1, energy algorithm 300.2, and the safing algorithm 200 each utilize values of filtered lateral acceleration component $\tilde{A}_y$ and filtered angular velocity $\tilde{\omega}_x$ that are compensated by subtracting the corresponding sensor offsets, i.e. the acceleration offset $$\tilde{A}_y^{Offset}$$

and the angular velocity offset $$\tilde{\omega}_x^{Offset}$$

respectively, so as to provide a corresponding compensated lateral acceleration component $$(A'_y(t) = \tilde{A}_y(t) - \tilde{A}_y^{Offset}(t))$$

and a compensated angular velocity $$(\omega'_x(t) = \tilde{\omega}_x(t) - \tilde{\omega}_x^{Offset}(t))$$

respectively.

Figure 5:
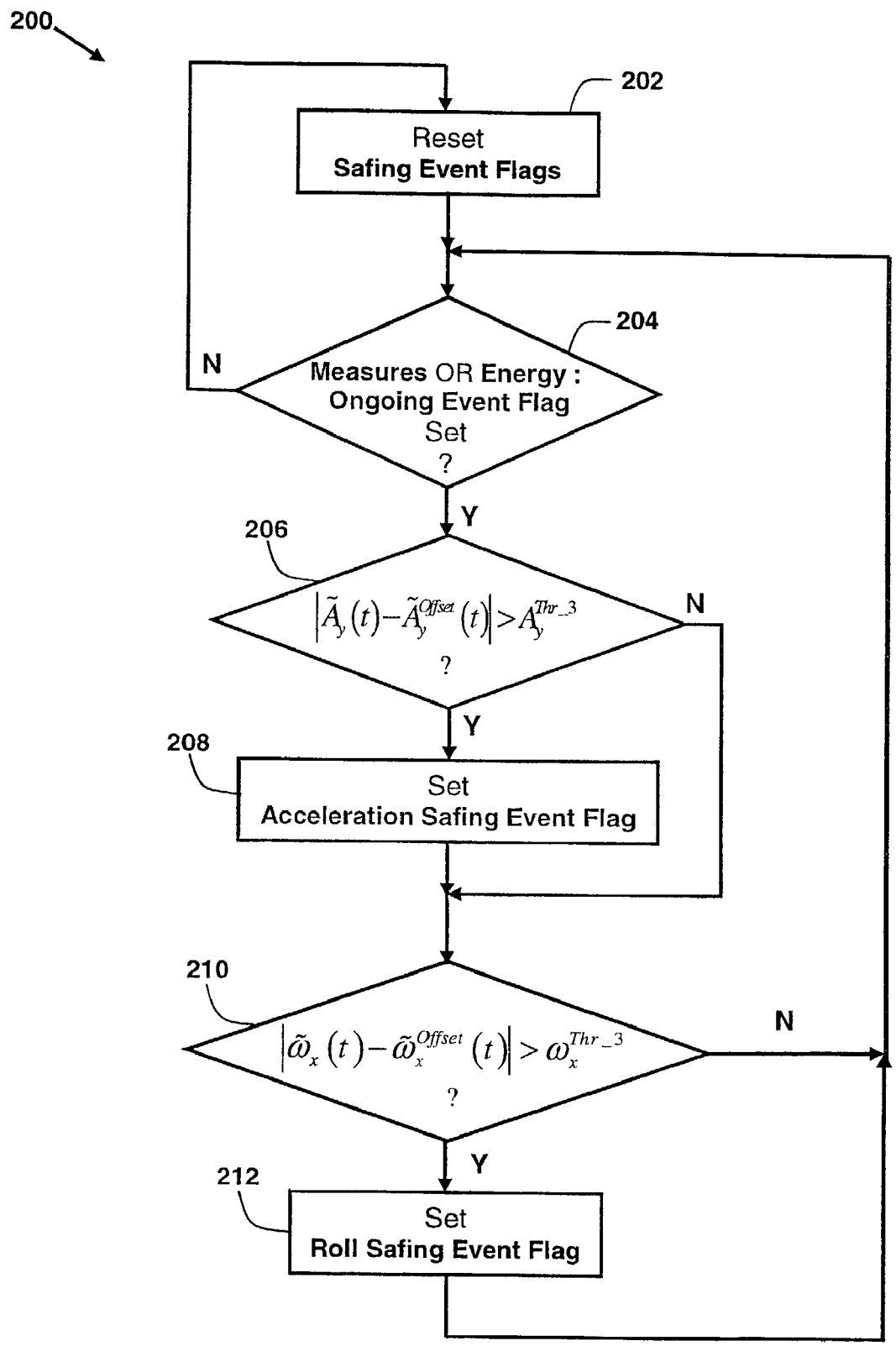
FIG. 5 illustrates a flow diagram of a safing algorithm incorporated in the rollover detection algorithm.
Figure 6:
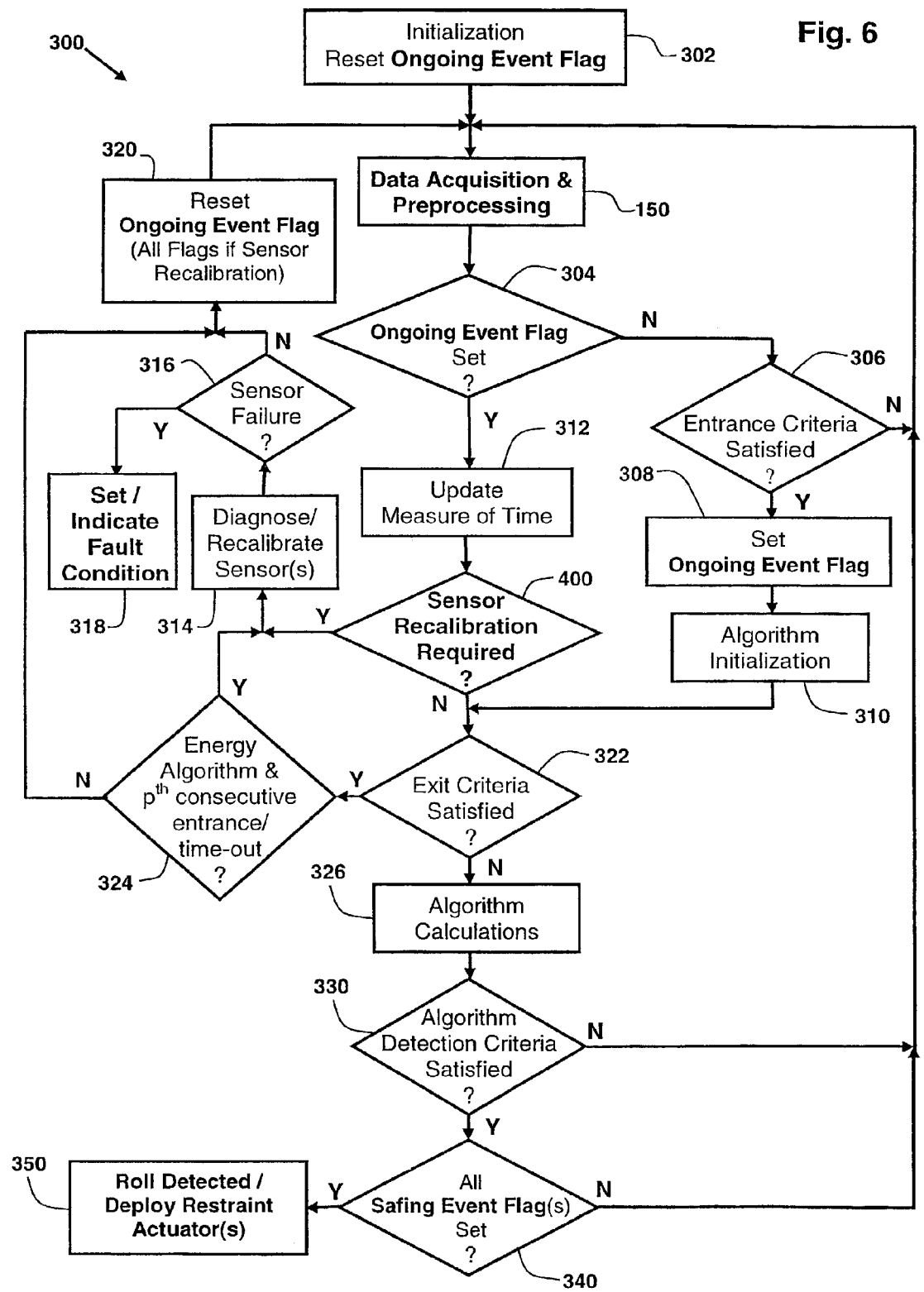
FIG. 6 illustrates a flow diagram of the rollover detection algorithm.

Referring to FIG. 5, the safing algorithm 200 commences with step (202), wherein associated SAFING_EVENT_FLAGs i.e. an ACCELERATION_SAFING_EVENT_FLAG and a ROLL_SAFING_EVENT_FLAG—are initially reset. Then, in step (204), if either the measures algorithm 300.1 or the energy algorithm 300.2 have been entered, as indicated by either of the associated ONGOING_EVENT_FLAGs (i.e. the ONGOING_MEASURES_EVENT_FLAG or the ONGOING_ENERGY_EVENT_FLAG) being set, then in step (206), if the magnitude of the compensated lateral acceleration component $A'_y$ is greater than a third acceleration threshold $$A_y^{Thr\_3},$$

then the ACCELERATION_SAFING_EVENT_FLAG is set in step (208). Otherwise, from step (204), the process repeats with step (202). Following step (208), or otherwise from step (206), in step (210), if the magnitude of the compensated angular velocity $\omega'_x$ is greater than a third angular velocity threshold $$\omega_x^{Thr\_3},$$

then the ROLLSAFING_EVENT_FLAG is set in step (212). Then, or otherwise from step (210), the process repeats with step (204). Accordingly, if the conditions on lateral acceleration and angular velocity associated with the safing algorithm 200 have been satisfied—not necessarily simultaneously—after at least one of the measures algorithm 300.1 and the energy algorithm 300.2 have commenced and before both have exited, then the respective associated SAFING_EVENT_FLAGs are set so as to enable a deployment of the one or more associated safety restraint actuators 30 responsive to the detection of a roll event by either the measures algorithm 300.1 or the energy algorithm 300.2. Each of the SAFING_EVENT_FLAGs are set, or latched, separately, but both are reset simultaneously, and both must be set in order for the one or more associated safety restraint actuators 30 to be actuated responsive to the measures algorithm 300.1 or the energy algorithm 300.2.

Alternately, the safing algorithm 200 may be adapted to incorporate only one of the above-described SAFING_EVENT_FLAGs and associated criteria, so that the safing criteria is responsive to at least one of a magnitude of the compensated lateral acceleration component $A'_y$ being greater than a third acceleration threshold $$A_y^{Thr\_3}$$

at a first point of time following a time of inception of either the measures algorithm 300.1 or the energy algorithm 300.2, and a magnitude of the compensated angular velocity $\omega'_x$ being greater than a third angular velocity threshold $$\omega_x^{Thr\_3}$$

at a second point of time following the time of inception, wherein the time of inception is the time at which the associated entrance criteria are satisfied for the associated measures algorithm 300.1 or energy algorithm 300.2, and the first and second points of time following the time of inception are arbitrary with respect to one another. For example, the energy algorithm 300.2 could be "safed" responsive solely to the compensated lateral acceleration component $A'_y$ being greater than a third acceleration threshold $$A_y^{Thr\_3}$$

at a point of time following a time of inception of the energy algorithm 300.2.

The rollover detection system 10 may be adapted for improved reliability by implementing the safing algorithm 200 on a microprocessor that is separate from that used to implement either the measures algorithm 300.1 or the energy algorithm 300.2, in which case if the sating algorithm 200 is not aware of the ONGOING_EVENT_FLAGs, then instead of being reset responsive to these flags, the SAFING_EVENT_FLAGs may be reset after a delay, e.g.

$$\Delta t_{max}^E$$

(e.g. 12 seconds), following a point in time at which either safing criteria was last satisfied so that the safing condition remains active until either a deployment of the one or more associated safety restraint actuators 30, or until after both algorithms will have had to have exited.

The measures algorithm 300.1 and the energy algorithm 300.2 each operate in accordance with the general algorithmic structure illustrated in FIG. 6, wherein each of these algorithms is indicated generally by reference number 300. A decimal designator to a particular reference number will be used herein to refer to a particular algorithm. For example, whereas the general overall process is referred to by reference number 300, reference number 300.1 is used to refer to the measures algorithm, and reference number 300.2 is used to refer to the energy algorithm. As an other example, whereas the general algorithm calculations step is referred to by reference number 326, reference number 326.1 is used to refer to the algorithm calculations step of the measures algorithm 300.1 in particular, and reference number 326.2 is used to refer to the algorithm calculations step of the energy algorithm 300.2. The particular equations associated with particular algorithmic steps, for each of the algorithms, are provided in tabular form in FIGS. 8a–c; and the associated parameters and exemplary values thereof are provided in tabular form in FIGS. 9a–b.

Referring to FIG. 6, the general roll processing algorithm commences with step (302), wherein a corresponding ONGOING_EVENT_FLAG is reset. The ONGOING_EVENT_FLAG, when set, indicates that the entrance criteria has been satisfied for the roll processing algorithm, and the corresponding exit criteria has not been satisfied, so that the associated algorithm is active. Then in step (150), the associated data that is used by the algorithm is acquired and preprocessed in accordance with the data acquisition and preprocessing algorithm 150 described hereinabove. Then, in step (304), if the ONGOING_EVENT_FLAG has not been set—indicating that data from a potential roll event is not being processed, and that the vehicle 12 is not then involved in a roll event—then, in step (306), a set of entrance criteria are evaluated and compared with associated thresholds, and if the entrance criteria are satisfied, then in step (308) the ONGOING_EVENT_FLAG is set, and in step (310), the algorithm is initialized, e.g. by initializing various dynamic variables associated with the algorithm.

Figure 7:
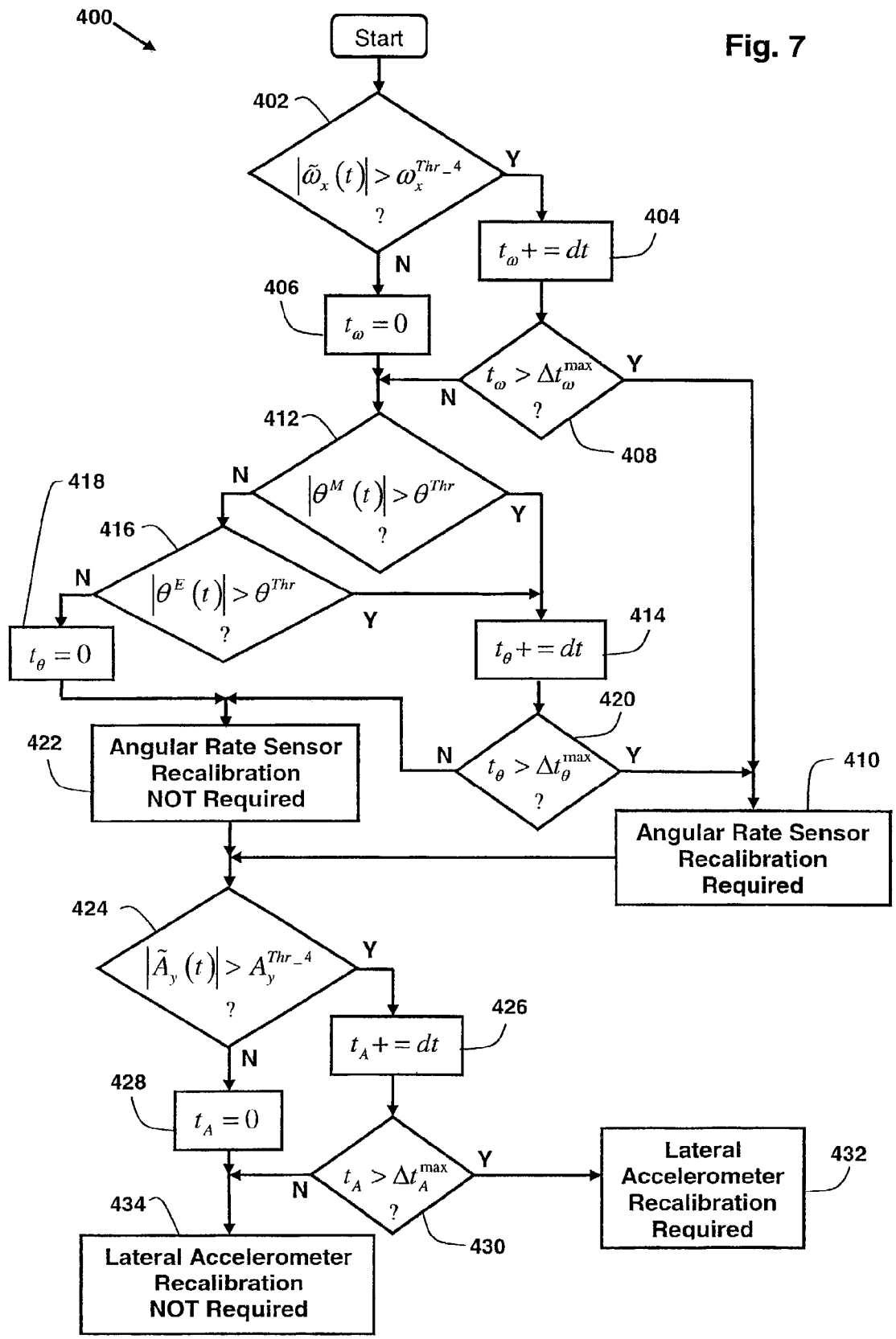
FIG. 7 illustrates a flow diagram of an algorithm incorporated in the rollover detection algorithm for determining if sensor recalibration is required.
Figure 11A:
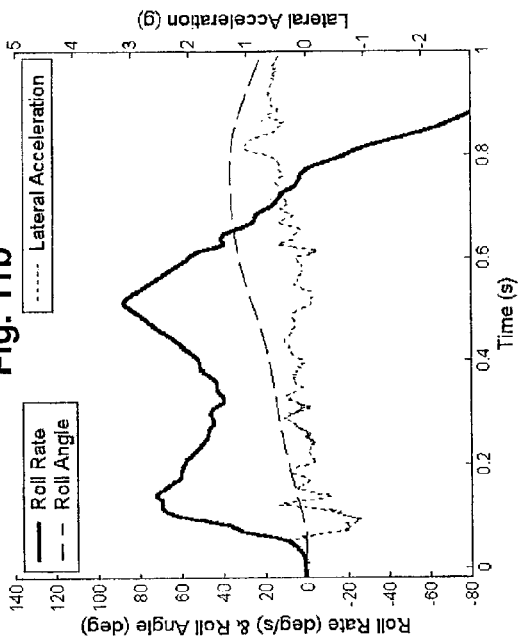
FIG. 11a illustrates a plot of filtered roll rate, roll angle and filtered lateral acceleration of a vehicle subjected to a corkscrew roll test designated as Test A, resulting in a rollover event.
Figure 11B:
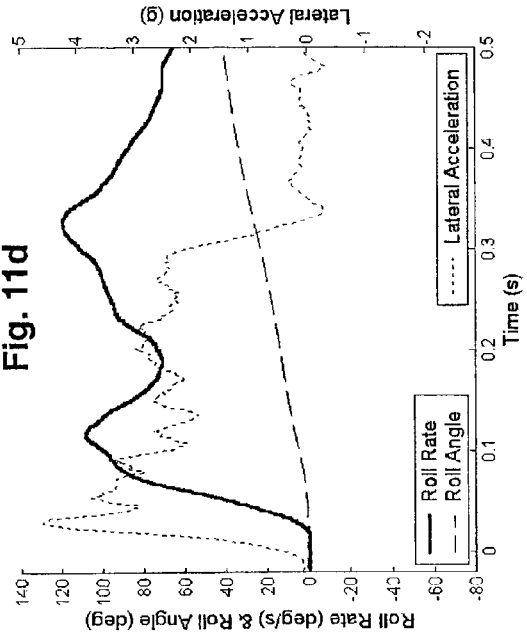
FIG. 11b illustrates a plot of filtered roll rate, roll angle and filtered lateral acceleration of a vehicle subjected to a corkscrew roll test designated as Test B, resulting in a non-rollover event.
Figure 11C:
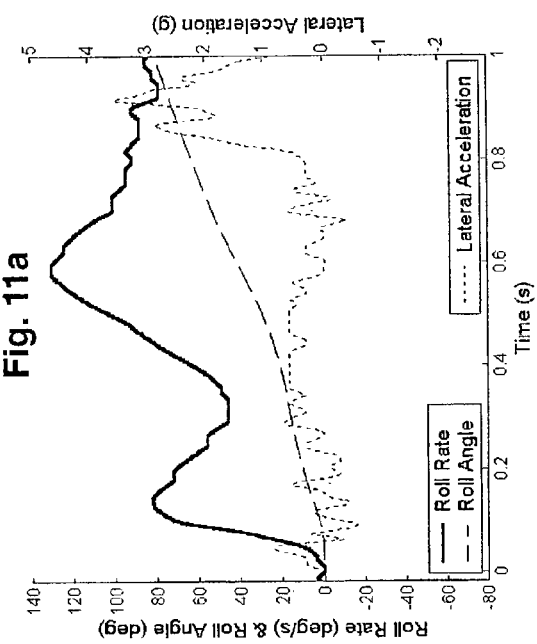
FIG. 11c illustrates a plot of filtered roll rate, roll angle and filtered lateral acceleration of a vehicle subjected to a deceleration sled test designated as Test C, resulting in a non-rollover event.
Figure 11D:
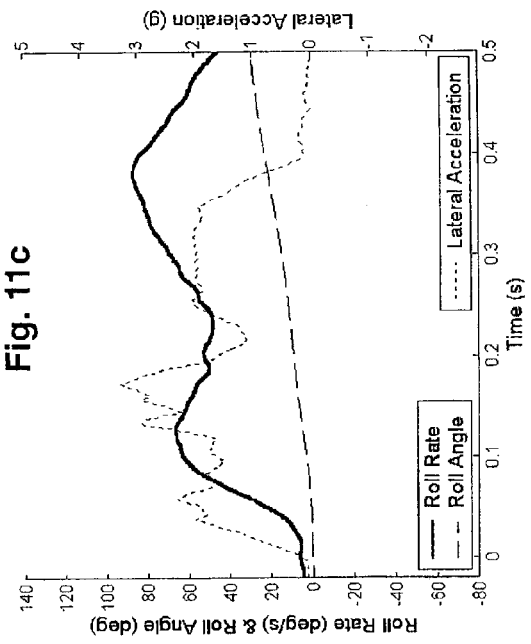
FIG. 11d illustrates a plot of filtered roll rate, roll angle and filtered lateral acceleration of a vehicle subjected to a deceleration sled test designated as Test D, resulting in a rollover event.

Otherwise, from step (304), if the ONGOING_EVENT_FLAG has been set—indicating that data from a potential roll event is being processed,—then in step (312) an associated measure of time, e.g. sample count, is updated, and in step (400), the newly acquired data is evaluated so as to determine if a sensor (i.e. the lateral accelerometer 18 or the angular rate sensor 20) needs to be recalibrated. The process associated with step (400) is illustrated in FIG. 7 and is described more fully hereinbelow.

If, from step (400), one or more sensors require recalibration, then in step (314), the one or more sensors requiring recalibation are recalibrated. For example, both the lateral accelerometer 18 and the angular rate sensor 20 may be testable, wherein a known stimulus may be applied to the sensor, and the corresponding sensor output may be calibrated so as to represent the known stimulus. For example, the lateral accelerometer 18 may comprise a micro-machined mass element suspended by spring-element beams, and an electrostatic field may be applied between the mass element and a housing so as to deflect the beam by an amount that corresponds to a reference acceleration level. A calibration factor is then calculated so that the calibrated output from strain sensing elements operatively connected to the spring-element beams corresponds to the reference acceleration level. If, in step (316), the process of step (314) indicates that one or more sensors have failed—for example, if there is substantially no change in output responsive to whether or not the test stimulus is applied to the sensor, then in step (318) a fault condition is set; a warning device, e.g. light, is activated so as to alert the driver of the vehicle 12; and the rollover detection system 10 is disabled from deploying any safety restraint actuators 30. Otherwise, from step (316), i.e. if neither the lateral accelerometer 18 nor the angular rate sensor 20 has failed, then, in step (320), both ONGOING_EVENT_FLAGs—i.e. the ONGOING_MEASURES_EVENT_FLAG and the ONGOING_ENERGY_EVENT_FLAG—are reset responsive to there having been at least one sensor recalibration, and the process repeats anew with step (150).

Otherwise, from step (400), if none of the sensors require recalibration, then, in step (322), an exit criteria is evaluated so as to determine whether the algorithm should be exited until such time that the entrance criteria of step (306) are again satisfied so as to enable the algorithm to be reentered.

If, from step (322), the exit criteria are satisfied, then, in step (324), if the algorithm is the energy algorithm 300.2, and if the energy algorithm 300.2 has consecutively been entered in step (306), and then exited in step (322) as a result of a time-out (i.e. $\Delta t > \Delta t_{max}^E$), then reentered in step (306) shortly—e.g. during the next iteration of the algorithm—after exiting in step (322), then after the $p^{th}$ consecutive exit in step (322)—e.g. p=3—the process continues with step (314) as described hereinabove, wherein the sensors are diagnosed, and if necessary, recalibrated. Otherwise, from step (324), the associated ONGOING_EVENT_FLAG—i.e. the ONGOING_MEASURES_EVENT_FLAG or the ONGOING_ENERGY_EVENT_FLAG—is reset in step (320), and the process repeats anew with step (150).

Otherwise, from step (322), if the algorithm has been entered in step (306) and not exited in step (322), then the associated algorithm calculations are performed for the particular iteration of the algorithm associated with a particular value of the measure of time from either steps (310) or (312). Then, in step (330), if the associated algorithm detection criteria are satisfied in the particular iteration of the algorithm, and if, in step (340), the SAFING_EVENT_FLAG(s)—i.e. the ACCELERATION_SAFING_EVENT_FLAG and the ROLL_SAFING_EVENT_FLAG—have been set, then in step (350) a roll event has been detected, and the associated safety restraint actuators 30 are actuated. Otherwise either, from step (330), if the algorithm detection criteria are not satisfied, or, from step (340), if all of the SAFING_EVENT_FLAG(s) have not been set—so that the associated safing criteria has not been satisfied at some point in time during either the measures algorithm 300.1 or the energy algorithm 300.2, then the process continues repeats beginning with step (150) for the next iteration.

Although both the measures algorithm 300.1 and the energy algorithm 300.2 depend upon measurements of the lateral acceleration component $A_y$ and the longitudinal angular velocity $\omega_x$ from the data acquisition and preprocessing algorithm 150, the other variables and parameters associated with each algorithm are otherwise independent of one another, as are the associated entrance criteria in step (306), algorithm initializations in step (310), exit criteria in step (322), algorithm calculations in step (326), and algorithm decision criteria in step (330), examples of all of which are detailed in FIGS. 8a, 8b, 8c, 9a and 9b. For example, whereas each algorithm determines a measure of time since inception, and calculates a measure of roll angle by integrating the measurement of longitudinal angular velocity $\omega_x$, these respective measures of time are independent of one another, as are the respective measures of roll angle. Both the measures algorithm 300.1 and the energy algorithm 300.2 assume that the vehicle is initially level (i.e. $\theta(t_{entrance})=0$) when the processing by the respective algorithms is commenced.

The process 400 for determining whether or not either the lateral accelerometer 18 or the angular rate sensor 20 requires recalibration is illustrated in FIG. 7. In steps (402), (404), (406) and (408), if the magnitude of the filtered angular velocity $\tilde{\omega}_x$ continuously exceeds a fourth angular rate threshold $$\omega_x^{Thr\_4}$$

for an associated period of time $$\Delta t_\omega^{max},$$

then a recalibration of the angular rate sensor 20 is signaled in step (410). Otherwise, in steps (412), (414), (416), (418) and (420), if the either the magnitude of the roll angle $\theta^M$ from the measures algorithm 300.1, or roll angle $\theta^E$ from the energy algorithm 300.2, continuously exceeds a roll angle threshold $\theta^{Thr}$ for an associated period of time $\Delta t_\theta^{max}$, then a recalibration of the angular rate sensor 20 is signaled in step (410). Otherwise, in step (422), a recalibration of the angular rate sensor 20 is not signaled. In steps (424), (426), (428) and (430), if the magnitude of the filtered lateral acceleration component $\tilde{A}_y$ continuously exceeds a fourth lateral acceleration threshold $$A_y^{Thr\_4}$$

for an associated period of time $$\Delta t_A^{max},$$

then a recalibration of the lateral accelerometer 18 is signaled in step (432). Otherwise, in step (434), a recalibration of the lateral accelerometer 18 is not signaled. If a recalibration was signaled in either steps (410) or (432), then the process continues with step (314) as described hereinabove. Otherwise, no sensor recalibration is signaled, and the process continues with step (322) as described hereinabove.

Referring to FIG. 6, FIGS. 8a–c, and FIGS. 9a–b, the measures algorithm 300.1 will now be discussed with greater particularity, wherein the steps of FIG. 6 are suffixed with "0.1" to indicate their association therewith. The ONGOING_EVENT_FLAG for measures algorithm 300.1—referred to as the ONGOING_MEASURES_EVENT_FLAG—is set in step (308.1) upon satisfaction of the entrance criteria in step (306.1), and is reset in step (320.1) upon satisfaction of the exit criteria in step (322.1). The ONGOING_MEASURES_EVENT_FLAG, for example, could correspond to a particular location in the memory 28 of the associated processor 26 that implements the measures algorithm 300.1. After entry following step (306.1), the measures algorithm 300.1 is not subsequently exited until either the measures event exit criteria is satisfied in step (322.1), or until a roll event is detected causing a deployment of the safety restraint actuators 30. Moreover, after the measures event exit criteria is satisfied and the measures algorithm 300.1 is exited, the measures algorithm 300.1 can be subsequently reentered if the associated measures event entrance criteria is subsequently satisfied.

In step (306.1), the entrance criteria of the measures algorithm 300.1 is, for example, that the magnitude of the compensated lateral acceleration component $A'_y$ be greater than a first acceleration threshold $A_y^{Thr\_1}$, i.e.:

$$|A'_y(t)| > A_y^{Thr\_1}$$

For an example of one particular type of vehicle, based upon actual rollover data, the first acceleration threshold $$A_y^{Thr\_1}$$

was set to about 1.4 g. It should be recognized that this threshold value, as well as the value of the other parameters of the measures algorithm 300.1, is generally dependent upon the characteristics of the particular associated vehicle 12 or class of vehicles, and that the particular value used for a particular rollover detection system 10 can be adjusted for improved discrimination dependent upon the nature of the associated vehicle 12 or class of vehicles.

In step (310.1), upon initial entrance to the measures algorithm 300.1 following step (308.1), the measures algorithm 300.1 is initialized. An event sample count $n^M$ and the values of angular position $\theta^M(n^M-1)$ and a measure function $R(n^M-1)$ are initialized—e.g. to values of zero. Also the sampled time $t^M(-1)$ just prior to the time of event entrance is initialized to a value of the time of measures event entrance $t^M(0)$, which is initialized to a value of the current time t; and the time period $\Delta t^M(0)$ since algorithm entrance is initialized to a value of zero. The superscript "M" used herein refers to variables associated with the measures algorithm 300.1.

Upon subsequent iteration of the measures algorithm 300.1, if in step (304.1) the ONGOING_MEASURES_EVENT_FLAG is set, then, in step (312.1), the event sample count $n^M$ is incremented, the associated current sampled time $t^M(n^M)$ is set equal to the current time t, and the measures event time $\Delta t^M$ is calculated as the period extending from the time of measures event entrance $t^M(0)$, to the current time $t^M(n^M)$ as follows:

$$\Delta t^M(n^M) = t^M(n^M) - t^M(0)$$

In step (322.1), the exit criteria of the measures algorithm 300.1 is, for example, that the time period since algorithm entrance $\Delta t^M(n^M)$ be greater than time period threshold $$\Delta t_{max}^M,$$

i.e.:

$$\Delta t^M(n^M) > \Delta t_{max}^M$$

For the example of one particular type of vehicle, based upon actual rollover data, the time period threshold $$\Delta t_{max}^M$$

was set to about 165 milliseconds. Upon exit from the measures algorithm 300.1, the ONGOING_MEASURES_EVENT_FLAG is reset in step (320.1), and pending subsequent satisfaction of the entrance criteria in step (306.1), this causes the variables associated with the measures algorithm 300.1 to be initialized in step (310.1).

If, in step (322.1), the exit criteria is not satisfied, then the algorithm calculations are updated in step (326.1) for the particular iteration of the measures algorithm 300.1, as follows.

First, the angular position $\theta^M$ is estimated by integrating the signed value of the compensated angular velocity $\omega'_x$ as follows:

$$\theta^M(n^M) = \theta^M(n^M-1) + \tilde{\omega}'_x(n^M) \cdot dt$$

wherein the integration time step dt is given by the difference between the time $t^M(n^M)$ at the current iteration, and the time at the previous iteration $t^M(n^M-1)$ which difference would be constant for a uniform sampling rate—as follows:

$$dt = t^M(n^M) - t^M(n^M-1)$$

and the compensated angular velocity $\omega'_x$ is given by:

$$\omega'_x(t) = \tilde{\omega}_x(t) - \tilde{\omega}_x^{Offset}(t)$$

A measure function R is then evaluated, which is used to calculate a figure-of-merit FOM. The measure function R is given by:

$$R(n^M) = R(n^M-1) \cdot \left(1 - \frac{\Delta t^M}{\tau}\right) + F^* \cdot KE^* \cdot PE^*$$

The first term of the measure function R is a damping term comprising the product of the previous value, $R(n^M-1)$ multiplied by a damping factor $$\left(1 - \frac{\Delta t^M}{\tau}\right).$$

. The level of damping is determined by a constant $\tau$ dependent upon the particular type of vehicle. For example, based upon rollover test data for a particular type of vehicle, the value of $\tau$ was determined to be about 400 seconds. The damping term ensures that the resulting figure-of-merit FOM will decrease for events for which the values of the compensated lateral acceleration component $A'_y$ or the compensated angular velocity $\omega'_x$ do not continue to be significant.

The remaining term of the measure function R, additive with the first term, is the product of the following three measures: a force measure F*, a rotational kinetic energy measure KE*, and a potential energy measure PE*.

The force measure F* is given as the current sample of the compensated lateral acceleration component $A'_y$, which is given by:

$$A'_y(n^M) = \tilde{A}_y(t) - \tilde{A}_y^{Offset}(t)$$

Generally, force and acceleration are related by Newton's second law (F=M·A). The force measure F* is not necessarily an exact measure of force—which would generally need to account for the vector nature of force and acceleration—but instead is a measure that is at least related to the reaction force F acting upon the vehicle 12. During a typical vehicle roll event, the compensated lateral acceleration component $A'_y$, is caused by a lateral force on the tires or wheel rim. This lateral force is the same force responsible for the rotational torque about the center of vehicle mass that leads to eventual rollover. The compensated lateral acceleration component $A'_y$, does not necessarily provide a complete measure of the actual reaction force F. For example, the compensated lateral acceleration component $A'_y$, does not necessarily account for the effects of non-rigid body dynamics, e.g. from damping forces in the tire(s) or other damping elements, or from the dynamics of the suspension system. However, the compensated lateral acceleration component $A'_y$ is heuristically—for small angles and excluding the effects of non-rigid body dynamics—proportional to the reaction force F that causes the vehicle 12 to roll. Data from fast or tripped rollover tests has shown that the compensated lateral acceleration component $A'_y$, becomes significant about 20 milliseconds before significant compensated angular velocity $\omega'_x$ is observed from angular rate sensor 20. Whereas the force measure F* is illustrated herein as linear with respect to the compensated lateral acceleration component $A'_y$, it should be understood that the force measure F* could be some other function (other than linear) or power (other than 1) of the compensated lateral acceleration component $A'_y$.

The rotational kinetic energy measure KE* is given by $\tilde{\omega}'^2_x$. Generally, the rotational kinetic energy measure KE* is related to the rotational kinetic energy of the vehicle. For example, with $$KE^* = \tilde{\omega}_x'^2,$$

the rotational kinetic energy measure KE* is proportional to the rotational kinetic energy of the vehicle 12 by the proportionality constant $I_x/2$. However, the rotational kinetic energy measure KE* could also be represented differently. For example, other powers of $\tilde{\omega}'_x$ other than 2 could be used to form the rotational kinetic energy measure KE* from compensated angular velocity $\omega'_x$, or the rotational kinetic energy measure KE* could be some other function of compensated angular velocity $\omega'_x$.

The product of the force measure F* and the rotational kinetic energy measure KE* provides for a measure that predicts rollover more quickly than compensated angular velocity $\omega'_x$ alone. This also provides a predictive measure of eventual compensated angular velocity $\omega'_x$, because it has been observed that significant lateral force inferred from the compensated lateral acceleration component $A'_y$, usually manifests as increased compensated angular velocity $\omega'_x$ about 20 milliseconds thereafter. Moreover, weighting the compensated angular velocity $\omega'_x$ more heavily than the compensated lateral acceleration component $A'_y$, e.g. by using the square of the compensated angular velocity $\omega'_x$, increases the influence of actual compensated angular velocity $\omega'_x$ upon the resulting figure-of-merit FOM.

The potential energy measure PE* is given as PE*=sign $(A'_y(n^M))\cdot\theta_0+\theta^M(n^M)$ as a constant plus the current sample of the angular position $\theta^M(n^M)$. The constant $\theta_0$ is dependent upon the particular vehicle. For example, based upon rollover test data for a particular type of vehicle, the value of $\theta_0$ is about 0.1 degrees. The constant term has the same sign as either the compensated angular velocity $\omega'_x$ or the compensated lateral acceleration component $A'_y$, assuming both signals are polarized so as to have the same polarity for a given roll event. Including the potential energy measure PE* in the product term of the measure function R increases the influence of roll dynamics upon the resulting figure-of-merit FOM and increases the magnitude thereof for medium-speed roll events, for example, events having associated actuator firing times (time-to-fire TTF) of typically between 140 and 230 milliseconds. (The bounds of this range could be extended by 20% or more depending upon the vehicle characteristics, and could be further different for different types of vehicles). Compared with the force measure F* and with the rotational kinetic energy measure KE*, the potential energy measure PE* is relatively less significant, and could be ignored (e.g., by setting PE*=1) in a reduced rollover detection system 10. However, the potential energy measure PE* appears to be beneficial for the subset of roll event cases exhibiting intermediate actuator firing times.

The figure-of-merit FOM is then given by:

$$FOM(n^M)=|R(n^M)|\cdot(|R(n^M)|-|R(n^M-1)|)$$

The figure-of-merit FOM is calculated from the absolute values of the associated $R(n^M)$ and $R(n^M-1)$ terms so that the figure-of-merit FOM is independent of the direction of roll. The term $(|R(n^M)|-|R(n^M-1)|)$ provides a measure of the derivative or slope of the measure function R with respect to time, wherein the actual slope would be given by dividing this term by the sampling period dt (a constant in uniformly sampled data systems). This slope factor, in combination with a threshold function described below, has the effect of requiring the figure-of-merit FOM to increase with time in order for a rollover event to be detected and for a resulting associated deployment of one or more safety restraint actuators 30.

Alternately, and particularly for relatively small values of $(|R(n^M)|-|R(n^M-1)|)$, the figure-of-merit FOM may be given by:

$$FOM(n^M)=|R(n^M)|$$

Following the algorithm calculations of step (322.1), the algorithm detection criteria evaluated in step (330.1) comprise a plurality of detection conditions, for example, as illustrated in FIG. 8c. If all of the detection conditions are satisfied—so that generally a measures event threshold is exceeded—then a rollover is considered likely to occur, and if in step (340), an associated safing criteria is satisfied from the safing algorithm 200, then in step (350), the associated one or more safety restraint actuators 30 are deployed so as to mitigate injury to the associated occupant or occupants. The detection criteria are established in accordance with a particular detection philosophy. Ideally, the detection criteria would IS provide for detection of any roll event for which there would be a head contact with the interior of the vehicle (i.e. a "head closure") of sufficient severity that injury to the occupant therefrom would be mitigated by a timely deployment of the associated one or more safety restraint actuators 30; and would provide for ignoring other events. However, if such ideal performance is not feasible, then the detection criteria can be adapted to provide a suitable compromise. For example, in order to detect severe roll events sufficiently fast—i.e. sufficiently sooner than the associated head closure time so that the associated one or more safety restraint actuators 30 can be actuated in time, and at a rate, so as to mitigate risk of injury to the occupant—it may be necessary to accept deployment of the associated one or more safety restraint actuators 30 responsive to severe rollover events that do not completely roll the vehicle (e.g. curb trip or mid-to-high-g deceleration type roll events).

As a first detection condition of step (330.1), the measures event time $\Delta t^M$ is tested to be within a range of measures event times ($\Delta t^M_{min}$, $\Delta t^M_{max}$), as follows:

$$\Delta t^M_{min} \leq \Delta t^M \leq \Delta t^M_{max}$$

For example, the associated minimum and maximum event times for one particular class of vehicles are $$\Delta t^M_{min} = 40 \text{ milliseconds}$$

and $$\Delta t^M_{max} = 165 \text{ milliseconds}$$

so that the period of time elapsed since the event trigger falls within a particular time window. The minimum measures event time $$\Delta t^{M\,n}_{max}$$

constraint prevents hard lateral input force events of very short duration from causing an inadvertent detection, while allowing for a sufficiently early safety restraint deployment to satisfy the earliest observed head closure times. (The head closure time is the time at which the head of an occupant contacts the interior of the vehicle). Typically, for severe curb trip or deceleration sled events, the roll discrimination algorithm entrance time would occur about 20 milliseconds after the start of the roll event (i.e. the beginning of the physical event). The earliest that the roll discrimination algorithm could begin to deploy the airbags would then be about 60 milliseconds after the start of the roll event (entrance time plus 40 milliseconds). The fastest observed head closure times are on the order of 115 milliseconds after the start of the roll event. Given that the associated data processing and safety restraint deployment (e.g. airbag inflation) takes about 30 milliseconds, the safety restraint actuator 30 would be fully deployed for these cases at about 90 milliseconds after the start of the roll event. The minimum fire time $\Delta t^{min}$ ensures that the information provided in the signals from lateral accelerometer 18 and angular rate sensor 20 has been utilized as much as possible while still enabling a deployment decision to be made in time to avoid head closure for severe events. The maximum firing time $\Delta t^{max}$ reduces the vulnerability of the roll discrimination algorithm to concatenated events, and may also enable the roll discrimination algorithm to reset and catch a second "real" initiator of a rollover in an accident where the second of two time-separated lateral events leads to rollover. If, in step (330.1), the measures event time $\Delta t^M$ is within the specified range, then the first detection condition is met, and additional detection criteria are evaluated in step (330.1). Otherwise, the process continues with step (150) for the next iteration.

As a second detection condition of step (330.1), the figure-of-merit FOM is compared with a threshold function $FOM^{Thr}(\Delta t^M)$ that, for the exemplary vehicle platform, provides for sufficiently fast discrimination times for substantially all events as necessary in accordance with the above-described detection philosophy. The threshold function $FOM^{Thr}(\Delta t^M)$, for example, has the following form:

$$FOM^{Thr}(\Delta t^M) = A \cdot \Delta t^M + B$$

The associated second detection condition is given by:

$$FOM(n^M) > FOM^{Thr}(\Delta t^M)$$

For example, based upon data from a set of rollover tests of a particular type of vehicle, A and B were given as A=6.46*10$^{11}$ (g$^2$deg$^6$/ms*s$^4$) and B=−2.34*10$^{13}$ (g$^2$deg$^6$/s$^4$) for (40 milliseconds$\leq \Delta t^M <$96 milliseconds), and as A=2.59*10$^{11}$ (g$^2$deg$^6$/ms*s$^4$) and B−1.36*10$^{13}$ (g$^2$deg$^6$/s$^4$) for (96 milliseconds$\leq \Delta t^M \leq$165 milliseconds). The figure-of-merit FOM and the threshold function $FOM^{Thr}(\Delta t^M)$, for example, both have engineering units of [g$^2$deg$^6$/s$^4$]. Generally, different types of vehicles would have either different parameter values or different functional forms for the threshold function $FOM^{Thr}(\Delta t^M)$. A multi-segmented threshold function $FOM^{Thr}(\Delta t^M)$, e.g. comprising a plurality of linear segments, has been found to be beneficial to the performance of the roll discrimination algorithm. The above exemplary threshold line was developed from data that was sampled at a rate of 1250 Hz for a time step of 0.8 milliseconds. The threshold function $FOM^{Thr}(\Delta t^M)$ would be different for different data sampling rates because of differences in the resultants of integrations involved in calculating the figure-of-merit FOM. Generally, the threshold function $FOM^{Thr}(\Delta t^M)$ could be represented by either a function of time, a piecewise function of time, or a table lookup with respect to time. Furthermore, whereas the threshold function $FOM^{Thr}(\Delta t^M)$ is generally a function of time—e.g. time period since inception—, it should be understood that this threshold function $FOM^{Thr}(\Delta t^M)$ could in some cases be constant, i.e. constant with respect to time. If, in step (330.1), the figure-of-merit FOM exceeds the threshold function $FOM^{Thr}(\Delta t^M)$, then the second detection condition is met, and additional detection criteria are evaluated in step (330.1). Otherwise, the process continues with step (150) for the next iteration.

As a third detection condition of step (330.1), the figure-of-merit FOM is tested to see if it is increasing in magnitude with respect to time at the time of prospective deployment of the safety restraint actuator(s) 30, as follows:

$$|FOM(n^M)| > |FOM(n^M - 1)| \text{ AND}$$

$$|FOM(n^M)| > |FOM(n^M - m)|, \text{ where } m>1, \text{ e.g. } m=6$$

The third detection condition is intended to prevent deployment in cases, for example, for which the threshold function $FOM^{Thr}(\Delta t)$ is exceeded, e.g. at $\Delta t$=40 milliseconds, but for which the event was decaying away (e.g. for which the magnitude of either $A_y$ or $\omega_x$ or both was decreasing). If, in step (330.1), the figure-of-merit FOM is increasing with respect to time, then the third detection condition is met and additional detection criteria are evaluated in step (330.1). Otherwise, the process continues with step (150) for the next iteration.

As a fourth detection condition of step (330.1), the magnitude of the compensated lateral acceleration component $A'_y$ at the time of prospective deployment of the safety restraint actuator(s) 30) is compared with a second acceleration threshold $$A_y^{Thr\_2},$$

as follows:

$$|A'_y(n^M)| > A_y^{Thr\_2}$$

The fourth detection condition prevents a failure of the angular rate sensor 20 in a mode that causes a large, false compensated angular velocity $\omega'_x$ signal from causing an inadvertent deployment of the safety restraint actuator(s) 30. For example, a second acceleration threshold $$A_y^{Thr\_2}$$

value of 0.7 g would likely not be exceeded during normal driving conditions for which there is no lateral tire slip on the driving surface. If, in step (330.1), the magnitude compensated lateral acceleration component $A'_y$ greater than the second acceleration threshold $$A_y^{Thr\_2},$$

then the fourth detection condition is met and additional detection criteria are evaluated in step (330.1). Otherwise, the process continues with step (150) for the next iteration.

As a fifth detection condition of step (330.1), the magnitude of the compensated angular velocity $\omega'_x$ is compared with an associated second roll rate threshold $\omega^{Thr\_2}$ at the time of prospective deployment of the safety restraint actuator(s) 30, as follows:

$$|\omega'_x(n^M)| > \omega^{Thr\_2}$$

For example, the second roll rate threshold $\omega^{Thr\_2}$ is about 50 degrees/second. The fifth detection condition ensures that the vehicle 12 is experiencing significant angular velocity at the time of deployment of the safety restraint actuator(s) 30. The second and fifth detection conditions in combination prevent severe side impact events from deploying the safety restraint actuator(s) 30. The fifth detection condition also prevents a failed lateral accelerometer 18—indicating a large, false lateral acceleration signal—from causing an inadvertent deployment of the safety restraint actuator(s) 30. If, in step (330.1), the magnitude of the compensated angular velocity $\omega'_x$ greater than the second roll rate threshold $\omega^{Thr\_2}$ then the fifth detection condition is met, and the process continues with step (340). Otherwise, the process continues with step (150) for the next iteration.

The herein-described measures algorithm 300.1 has been successfully tested with data from a series of vehicle rollover tests, and has been demonstrated to provide a reliable prediction of eventual vehicle rollover. For roll events caused by high lateral acceleration, predictions can be made relatively quickly, which enables the measures algorithm 300.1 to deploy the airbags before head closure for the type of roll events where head closure typically occurs most rapidly. Generally, the measures algorithm 300.1 is beneficial in providing relatively early rollover detection and relatively early time-to-fire (TTF's) of the associated safety restraint actuator(s) 30, for short and medium time roll events, similar to curb trip and high-g lateral deceleration type events.

Accordingly, the rollover detection system 10 incorporating the measures algorithm 300.1 provides for improved discrimination of vehicle rollover that allows for rollover airbag deployment times that meet occupant head closure times while minimizing inadvertent deployments, by:
  utilizing the measured lateral acceleration to aid in predicting future (20–30 ms later) roll motion;
  combining lateral acceleration with angular speed and total rotation angle to produce a measure of the current rotation state and dynamics, and the forcing function that is producing the rotation, without requiring the use of initial vehicle angle information for roll events where the starting angle is less than about 20 degrees from horizontal; and
  utilizing vehicle-specific dynamics properties (as derived from rollover test data) combined with early measured vehicle responses to allow for a prediction of eventual vehicle rollover before such outcome is definitive.

Referring to FIG. 10 four different vehicle test conditions—designated as Test A, Test B, Test C and Test D, are tabulated for purposes of illustrating and comparing the measures algorithm 300.1 and the energy algorithm 300.2 (the energy algorithm 300.2 is described more fully hereinbelow). Tests A and B are corkscrew type tests, which illustrate conditions for which the energy algorithm 300.2 exhibits faster rollover detection than the measures algorithm 300.1, and Tests C and D are deceleration sled tests for which the measures algorithm 300.1 exhibits faster rollover detection than the energy algorithm 300.2. The vehicle rolled over in Tests A and D, but did not roll over in Tests B and C, but rather achieved a maximum roll angle of 37 and 34 degrees respectively. The initial vehicle speed, average vehicle deceleration, and associated detection and event times are also tabulated in FIG. 10, wherein the head closure time is the time at which the head of the occupant (dummy) actual struck the interior of the vehicle.

Referring to FIGS. 11a–d, the filtered roll rate (angular rate) from an angular rate sensor 20, roll angle, and filtered lateral acceleration from a lateral accelerometer 18 are illustrated as a function of time for each of Tests A–D respectively in accordance with the conditions that are tabulated in FIG. 10.

Figure 12:
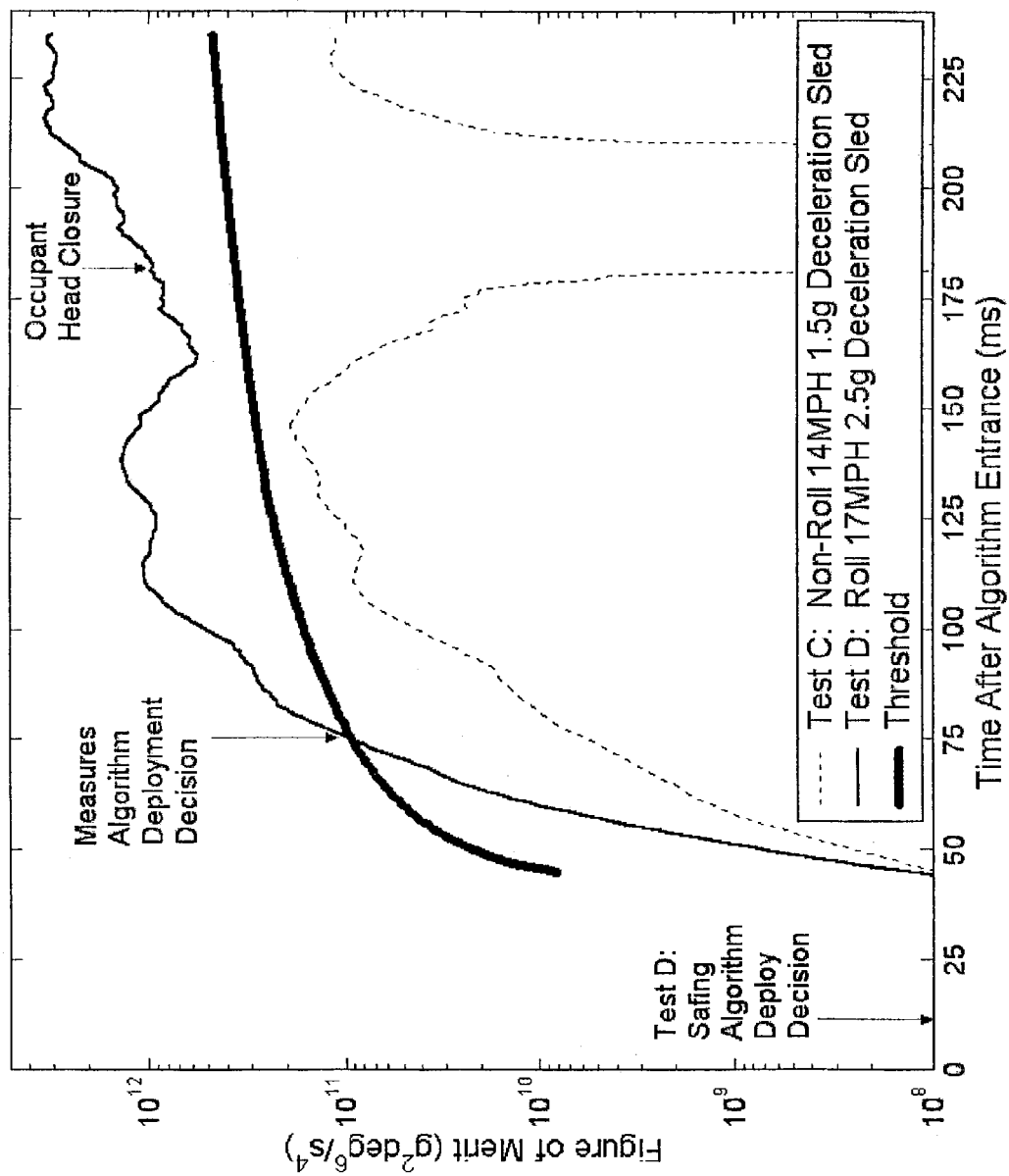
FIG. 12 illustrates plots of a figure-of-merit and an associated deployment threshold for a rollover measure as a function of time, in accordance with a measures algorithm, for the rollover event of Test D and the non-rollover event of Test C.

Referring to FIG. 12, the calculated figure-of-merit FOM is plotted for Tests C and D as a function of measures event time $\Delta t^M$, i.e. the time since inception of the measures algorithm 300.1 for actual sled deceleration tests of a particular type of vehicle in accordance with the table of FIG. 10. FIG. 12 also illustrates an associated threshold function $FOM^{Thr}(\Delta t^M)$ for the particular type of vehicle. Test D caused the vehicle to rollover and Test C reached a maximum rotation angle of about 34 degrees. The figureof-merit FOM($n^M$) calculated by the herein-described measures algorithm 300.1 in conjunction with the associated threshold function $FOM^{Thr}(\Delta t^M)$, enabled a firing time (TTF) of 98 milliseconds after inception of the roll event for test D, for which the vehicle rolled over, which was substantially before the associated head closure time of 196 milliseconds, thereby providing 98 milliseconds within which to deploy the associated one or more safety restraint actuators 30. The safing criteria of associated safing algorithm 200 were satisfied 26 milliseconds after inception of the roll event, which was substantially before the detection criteria was satisfied by the measures algorithm 300.1. By comparison, the detection criteria of the hereinbelow described energy algorithm 300.2 were not satisfied for the event of Test D until 594 milliseconds after inception of the roll event, which was substantially after the associated head closure time, thereby illustrating the benefit of the measures algorithm 300.1 for the roll event of Test D.

Referring to FIG. 6, FIGS. 8*a–c*, and FIGS. 9*a–b*, the energy algorithm 300.2 will now be discussed with greater particularity, wherein the steps of FIG. 6 are suffixed with "0.2" to indicate their association therewith. The ONGOING_EVENT_FLAG for energy algorithm 300.2—referred to as the ONGOING_ENERGY_EVENT_FLAG—is set in step (308.2) upon satisfaction of the entrance criteria in step (306.2), and is reset in step (320.2) upon satisfaction of the exit criteria in step (322.2). The ONGOING_ENERGY_EVENT_FLAG, for example, could correspond to a particular location in the memory 28 of the associated processor 26 that implements the energy algorithm 300.2. After entry following step (306.2), the energy algorithm 300.2 is not subsequently exited until either the energy event exit criteria is satisfied in step (322.2), or until a roll event is detected causing a deployment of the safety restraint actuators 30. Moreover, after the energy event exit criteria is satisfied and the energy algorithm 300.2 is exited, the energy algorithm 300.2 can be subsequently reentered if the associated energy event entrance criteria is subsequently satisfied.

The energy algorithm 300.2 utilizes the angular velocity sax signal from angular rate sensor 20 to determine the roll state of the vehicle and compare the total energy (rotational kinetic and potential) of the vehicle 12 with that needed to completely roll.

In step (306.2), the entrance criteria of the energy algorithm 300.2 is, for example, that the magnitude of the compensated lateral acceleration components $A'_y$ be greater than a first acceleration threshold $$A_y^{Thr\_1},$$

OR that the magnitude of the compensated angular velocity $\omega'_x$ be greater than a first roll rate threshold $\omega^{Thr\_1}$ i.e.:

$$|A'_y(n^E)| > A_y^{Thr\_1} \text{ OR } |\omega'_x(n^E)| > \omega^{Thr\_1}$$

For an example of a particular type of vehicle, based upon actual rollover data, the first acceleration threshold $$A_y^{Thr\_1}$$

was set to about 1.4 g (as for the measures algorithm 300.1) and the first roll rate threshold $\omega^{Thr\_1}$ was set to about 19 degrees/second. It should be recognized that this threshold value, as well as the value of the other parameters of the energy algorithm 300.2, is generally dependent upon the characteristics of the particular associated vehicle 12 or class of vehicles, and that the particular value used for a particular rollover detection system 10 can be adjusted for improved discrimination dependent upon the nature of the associated vehicle 12 or class of vehicles.

In step (310.2), upon initial entrance to the energy algorithm 300.2 following step (306.1), the energy algorithm 300.2 is initialized. An event sample count $n^E$ and the value of angular position $\theta^E(-1)$ are initialized—e.g. to values of zero. Also the sampled time $t^E(-1)$ just prior to the time of event entrance is initialized to a value of the time of energy event entrance $t^E(0)$, which is initialized to a value of the current time t; and the time period $\Delta t^E(0)$ since algorithm entrance is initialized to a value of zero. Furthermore, a second event sample count $n^{\omega E}$ is initialized to zero, as is a time period $\Delta t^{E*}$ since roll direction change. The superscript "E" used herein refers to variables associated with the energy algorithm 300.2.

Upon subsequent iteration of the energy algorithm 300.2, if, in step (304.2), the ONGOING_ENERGY_EVENT_FLAG is set, then, in step (312.2), the event sample count $n^E$ is incremented, the associated current sampled time $t^E(n^E)$ is set equal to the current time t, and the energy event time $\Delta t^E$ is calculated as the period extending from the time of energy event entrance $t^E(0)$ to the current time $t^E(n^E)$ as follows:

$$\Delta t^E(n^E) = t^E(n^E) - t^E(0)$$

In step (322.2), one exit criteria of the energy algorithm 300.2 is, for example, that the energy event time $\Delta t^E$ be greater than a maximum time period threshold $$\Delta t^E_{max},$$

i.e.:

$$\Delta t^E(n^E) > \Delta t^E_{max}$$

Another exit criteria of the energy algorithm 300.2 is, for example, that the energy event time $\Delta t^E$ be greater than a minimum time period threshold $$\Delta t^E_{min},$$

and that the time period since the entrance criteria of step (306.2) was most recently satisfied is greater than a second time period threshold $\Delta t_{Event}^E$, i.e., as follows:

$$\Delta t^E(n^E) > \Delta t_{min}^E \text{ AND } \Delta t^E(n^E) - \Delta t^{E*} > \Delta t_{Event}^E$$

The energy algorithm 300.2 requires a substantially longer period of time than the measures algorithm 300.1 before being restarted (i.e. exited and reset) because of possibility of relatively slow rollover events. For the example of a particular type of vehicle, based upon actual rollover data, the time period threshold $$\Delta t_{max}^E$$

was set to about 12 seconds, the minimum time period threshold $$\Delta t_{min}^E$$

was set to about 4 seconds, and the second time period threshold $$\Delta t_{Event}^E$$

was set to about 2 seconds. Accordingly, for this example, the energy algorithm 300.2 is executed for at least 4 seconds but not more than 12 seconds, and subject to these limitations, is exited if the time period since the entrance criteria was most recently satisfied exceeds 2 seconds. Upon exit from the energy algorithm 300.2, the ONGOING_ENERGY_EVENT_FLAG is reset in step (320.2), after which a subsequent satisfaction of the entrance criteria in step (306.2) causes the variables associated with the energy algorithm 300.2 to be initialized in step (310.2).

If, in step (322.2), the exit criteria is not satisfied, then the algorithm calculations are updated in step (326.2) for the particular iteration of the energy algorithm 300.2, as follows.

First the angular position $\theta^E$ is estimated by integrating the signed value of the compensated angular velocity $\omega'_x$ as follows:

$$\theta^E(n^E) = \theta^E(n^E - 1) + \omega'_x(n^E) \cdot dt$$

wherein the integration time step dt is given by the difference between the time $t^E(n^E)$ at the current iteration, and the time at the previous iteration $t^E(n^E-1)$—which difference would be constant for a uniform sampling rate—as follows:

$$dt = t^E(n^E) - t^E(n^E - 1)$$

and the compensated angular velocity $\omega'_x$ is given by:

$$\omega'_x(t) = \tilde{\omega}_x(t) - \tilde{\omega}_x^{Offset}(t)$$

In step (326.2), the algorithm calculations are further adapted to compensate for offsets in the angular velocity $\omega_x$ signal due either to gyroscope error, or to an offset as a result of significant vehicle motion, that may not otherwise be adequately compensated in the compensated angular velocity $\omega'_x$, particularly for rough road conditions for which the angular velocity $\omega_x$ signal may exhibit substantial oscillatory behavior. The energy algorithm 300.2 does not exit for at least $$\Delta t_{Event}^E$$

seconds, e.g. 2 seconds, following the most recent time at which the algorithm entrance criteria were satisfied, which thereby provides for extending the duration of the energy algorithm 300.2 for up to $$\Delta t_{max}^E$$

seconds, e.g. 12 seconds, which can lead to a substantial roll angle integration errors (e.g. 24 to 36 degrees) for a relatively small offset—e.g. 2–3 degrees/second—in the signal from the angular rate sensor 20. On a rough road, the vehicle 12 can exhibit substantial oscillatory roll motion, and a "rough road event" would be characterized by an angular velocity $\omega_x$ that oscillates about the true angular velocity offset $$\tilde{\omega}_x^{Offset}(t).$$

Figure 13:
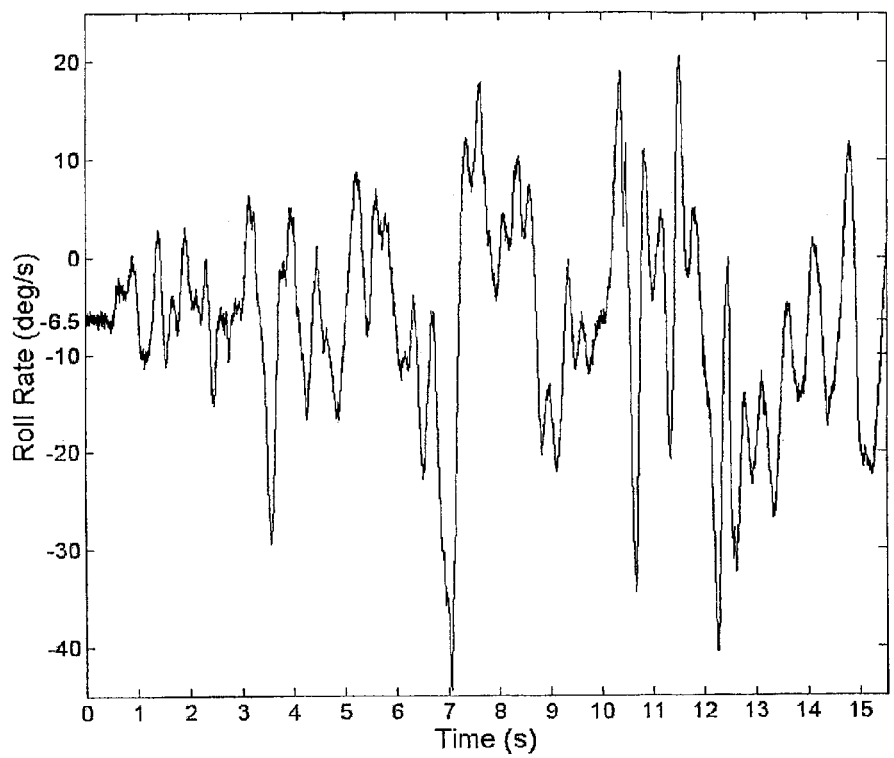
FIG. 13 illustrates a plot of roll rate as a function of time for a signal having a roll rate offset.

For example, referring to FIG. 13, an angular velocity $\omega_x$ signal having a true angular velocity offset $$\tilde{\omega}_x^{Offset}(t)$$

of −6.5 degrees/second is plotted as a function of time. Because typical roll events do not exhibit a change in sign of compensated angular velocity $\omega'_x$ during the roll event, it is possible to recognize a rough road condition from oscillation in the compensated angular velocity $\omega'_x$ signal. Under these conditions, the integrated roll angle $\theta^E$ is damped toward zero degrees every time the compensated angular velocity $\omega'_x$ changes sign, according to the following equation:

$$\theta^E(n^E) = \theta^E(n^E - 1) \cdot \text{MAX}\left(\frac{1024 - (n^E - n_\omega^E)}{1024}, 0.5\right) \text{ and}$$

$$n_\omega^E = n^E$$

wherein the counter $n^{\omega E}$ is set equal to the event sample count $n^E$ at the time of reversal, which provides for damping the roll angle $\theta^E$ by an amount between 0.1% and 50% each time the compensated angular velocity $\omega'_x$ changes direction, depending upon the period of time since the most recent change of direction.

Figure 14:
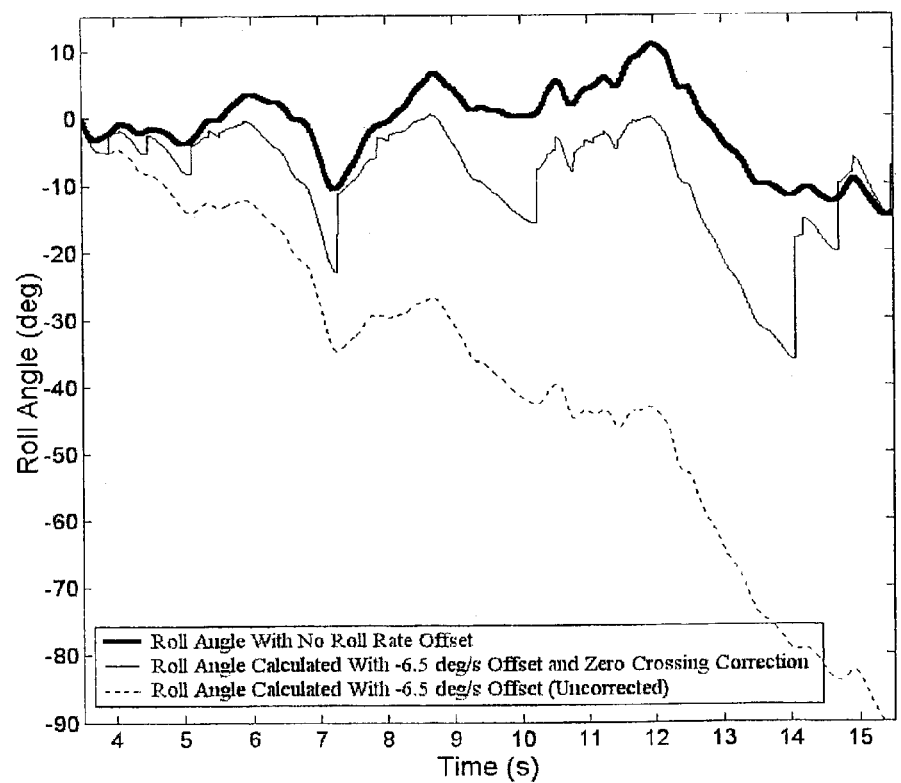
FIG. 14 illustrates plots of roll angle as a function of time based upon the data of FIG. 13, for various associated processes for determining roll angle from roll rate.

Referring to FIG. 14, the affect of the above-described compensation for the roll oscillation effect is illustrated, wherein the roll angle $\theta^E$, integrated from the angular velocity $\omega_x$ (roll rate) data plotted in FIG. 13, is plotted as a function of time for various conditions. As the first condition, the true angular velocity offset $$\tilde{\omega}_x^{Offset}$$

of −6.5 degrees/second is removed prior to integration. As the second condition, the roll angle $\theta^E$ is integrated from the biased angular velocity $\omega_x$ data, and then compensated for roll oscillation as described hereinabove. As the third condition, the roll angle $\theta^E$ is integrated from the biased angular velocity $\omega_x$ data without the above-described compensation for roll oscillation, which illustrates the potential for false detection of a roll event as a result of an uncompensated angular velocity $\omega_x$ bias for relatively long integration intervals. The above-described compensation for roll oscillation substantially corrects for roll-oscillation induced integration errors, without adversely affecting the detection of an actual roll event for which the angular velocity co, is substantially unidirectional.

In step (326.2), the algorithm calculations further provide for recording the latest time at which the entrance criteria of step (306.2) are satisfied, so as to provide a supplemental basis for the exit criteria of step (322.2), as follows:

$$\text{If } |A'_y(n^E)| > A_y^{Thr\_1} \text{ OR } |\omega'_x(n^E)| > \omega_x^{Thr\_1} \text{ then } \Delta t^{E*} = \Delta t^E$$

Following the algorithm calculations of step (322.2), the algorithm detection criteria evaluated in step (330.2) comprise a plurality of detection conditions, for example, as illustrated in FIG. 8c. If all of the detection conditions are satisfied—so that generally an energy event threshold is exceeded—then a rollover is considered likely to occur, and if in step (340), an associated safing criteria is satisfied from the safing algorithm 200, then in step (350), the associated one or more safety restraint actuators 30 are deployed so as to mitigate injury to the associated occupant or occupants. The detection criteria of the energy algorithm 300.2 are established in accordance with a detection philosophy similar to that described hereinabove for the measures algorithm 300.1.

Figure 15:
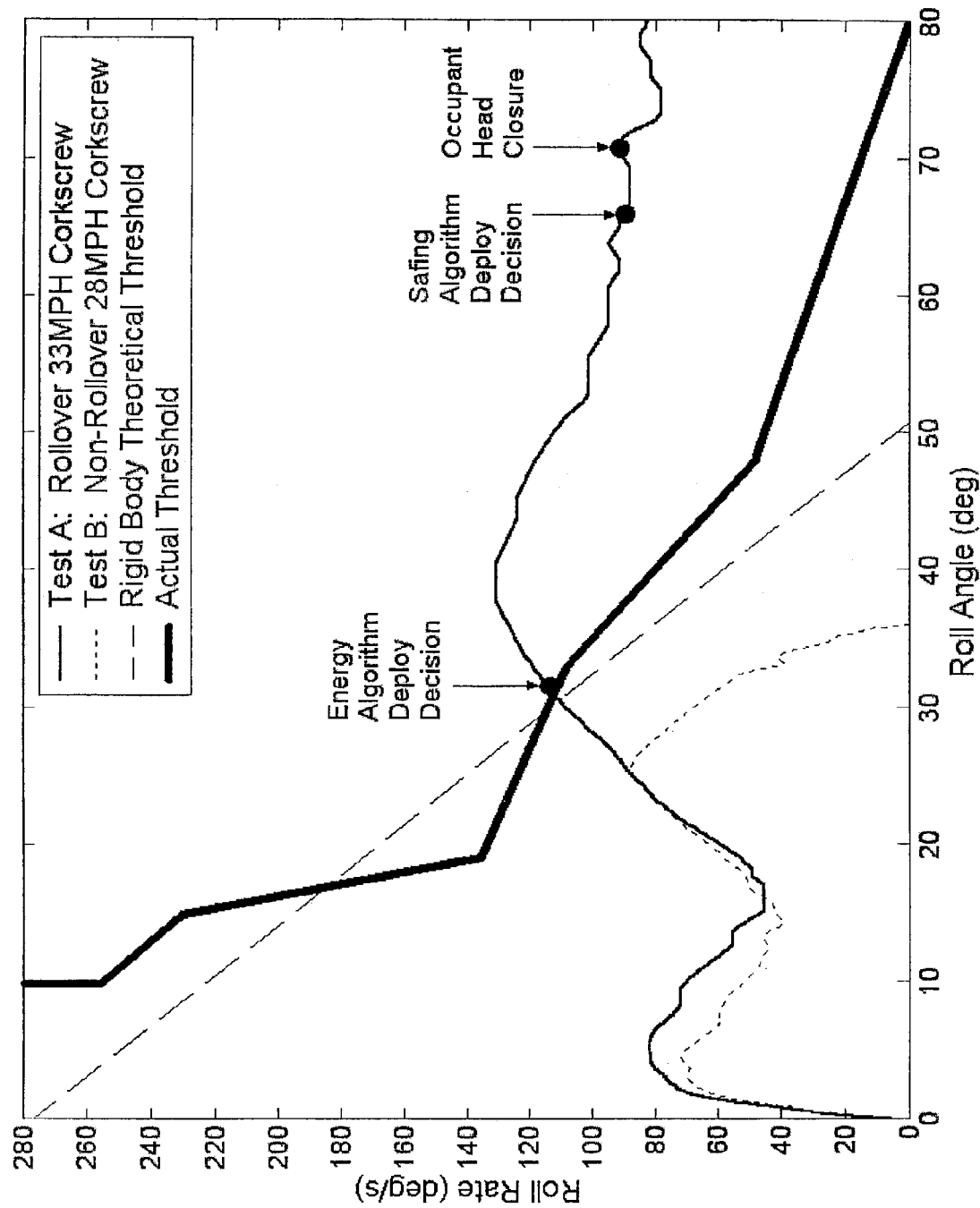
FIG. 15 illustrates plots of roll rate as a function of roll angle, and plots of associated rollover thresholds, in accordance with an energy algorithm, for the rollover event of Test A and the non-rollover event of Test B.

The principal detection criteria of the energy algorithm 300.2 are based upon the behavior of the compensated angular velocity $\omega'_x$ and roll angle $\theta^E$, and the associated trajectory thereof, in the associated phase-space of angular velocity and roll angle (i.e. the $\omega$-$\theta$ phase-space). An example of the $\omega$-$\theta$ phase-space is illustrated in FIG. 15.

In accordance with rigid body dynamics, there exists a theoretical threshold boundary in phase-space that distinguishes between roll and non-roll events of an associated rigid body. For example, this theoretical threshold boundary is given by:

$$\omega^{Thr}(\theta) = \sqrt{\frac{2mg \cdot \left[\frac{T^2}{4} + h_{CG}^2\right]^{\frac{1}{2}} \cdot \left[1 - \sin\left(\theta + \tan^{-1}\left(\frac{2h_{CG}}{T}\right)\right)\right]}{I}}$$

where mg is the weight of the vehicle, T is the vehicle track width, I is the vehicle moment of inertia in roll, and $h_{CG}$ is the height of the vehicle center of gravity. This equation is nearly linear in the $\omega$-$\theta$ plane over the region of interest. However, because of non-rigid body effects, the practical threshold boundary is beneficially modeled as a piecewise-linear boundary comprising, for example, a series of about 5 or 6 connected line segments that generally follow the above theoretical threshold boundary, but which can be tailored for a particular vehicle 12 or vehicle platform to improve discrimination between roll and non-roll events. Generally, this boundary could be represented by either a function in phase-space (e.g. a function of roll angle $\theta$), a piecewise function in phase-space (e.g. a piecewise function of roll angle $\theta$), or a table lookup in phase-space. Referring to FIG. 15, actual rollover test data—filtered using the hereinabove-described running average filter—for Tests A and B of FIGS. 11a and 11b respectively, in accordance with the conditions of FIG. 10, is plotted in the $\omega$-$\theta$ phase-space, together with an example of the associated theoretical threshold boundary and an example of a practical, piecewise-linear threshold boundary.

The distance between the current ordered pair ($\omega'_x(n^E)$, $\theta^E(n^E)$) and the linear segment of the practical threshold boundary is calculated for each iteration for the linear segment 10 whose associated endpoint angle values $\theta_k$, $\theta_{k+1}$ bound the current roll angle $\theta^E(n^E)$. Each linear segment of the practical threshold boundary is defined by its endpoints ($\omega_k, \theta_k$) and ($\omega_{k+1}, \theta_{k+1}$). The distance D between the current ordered pair and the appropriate linear segment of the practical threshold boundary is given by:

$$D(\tilde{\omega}_x, \theta^E, n^E, k) = \frac{[(\omega_{k+1} - \omega_k) \cdot (\theta^E(n^E) - \theta_k) - (\theta_{k+1} - \theta_k) \cdot (|\omega'_x(n^E)| - \omega_k)]}{\sqrt{(\theta_{k+1} - \theta_k)^2 + (\omega_{k+1} - \omega_k)^2}}$$

whereby, if this distance is less than zero, then the practical threshold boundary has been crossed.

The slope of the trajectory of ($\omega'_x(n^E)$, $\theta^E(n^E)$) in the $\omega$-$\theta$ phase-space is given by:

$$Slope(n^E) = \frac{\omega'_x(n^E) - \omega'_x(n^E - 1)}{\theta^E(n^E) - \theta^E(n^E - 1)}$$

and the associated angle of this slope in the $\omega$-$\theta$ phase-space is given by:

$$\beta = \tan^{-1}\left(Slope(n^E) \cdot \frac{180}{\pi}\right)$$

If, in step (330.2), the angle $\beta$ is within limits (i.e. $\beta^{min} < \beta < \beta^{max}$, where e.g. $\beta^{min}$=75 degrees and $\beta^{max}$=90 degrees), the magnitude of the roll rate is increasing with time (i.e. $|\omega'_x(n^E)|-|\omega'_x(n^E-1)|>0$), the distance to the practical threshold boundary is less than zero (i.e. $D(\tilde{\omega}'_x, \theta^E, n^E, k)<0$) and the roll angle $\theta^E$ is greater than a roll angle threshold $\theta^{Thr}$ (i.e. $|\theta^E|>\theta^{Thr}$, where e.g. $\theta^{Thr}=10$ degrees), then the energy detection criteria are satisfied. Alternately, the energy detection criteria are satisfied if the distance in $\omega$-$\theta$ phase-space is less than a threshold $D^{Thr}$ (i.e. $D(\tilde{\omega}'_x, \theta^E, b^E, k)<D^{Thr}$, where e.g. $D^{Thr}=-2.5 \sqrt{deg^2+(deg/sec)^2}$) and the roll angle $\theta^E$ is greater than the roll angle threshold $\theta^{Thr}$ (i.e. $|\theta^E|>\theta^{Thr}$). If the energy detection criteria are satisfied in step (330.2), and if, in step (340), the safing criteria are satisfied, then, in step (350), the associated one or more safety restraint actuators 30 are deployed so as to mitigate injury to the associated occupant or occupants.

The energy algorithm 300.2 deployment decision is not latched, so that, if the safing criteria has not been satisfied by the time the detection criteria of the energy algorithm 300.2 is satisfied, then the energy algorithm 300.2 continues to be iterated until either the safing criteria is satisfied, or the energy algorithm 300.2 is otherwise exited in step (322.2)

It should be understood that the measures algorithm 300.1 and the energy algorithm 300.2 can be executed in series or in parallel, on a common processor 26 or on separate processors 26. If executed in series, then the steps illustrated in FIG. 6 for one iteration are completed for one of the algorithms, then the other algorithm would commence with either step (302) for the first pass, or step (150) for subsequent passes.

Whereas the rollover detection algorithm has been illustrated with equations in a particular form, it should be understood that these calculations may be implemented on a particular processor 26 in a variety of ways without departing from the scope of the teachings herein. For example, the particular calculations described herein may require modification in order to be practically implemented on a particular processor, for example, depending upon the resolution of associated analog-to-digital converters, and the type and precision of mathematical operations that can be performed by the particular processor 26, and the preferred word size of the particular processor 26.

Whereas the roll discrimination algorithm is illustrated herein as applied to sampled data, it should be understood that the algorithm could also be implemented continuously, for example, using an analog processor. Moreover, it should be understood that the event sample count $n^M$ may be either explicit or implicit in the actual implementation of the roll discrimination algorithm, and that the associated time-dependent variables can be expressed as functions of either time t or event sample count $n^M$, $n^E$.

Whereas the measures algorithm 300.1 and the energy algorithm 300.2 have been illustrated as utilizing a measure of roll angle that is found by integrating the associated compensated angular velocity $\omega'_x$, it should be understood that a measured roll angle, e.g. from an incline sensor, could be used instead of a calculated roll angle.

Referring to FIG. 16, in accordance with another embodiment, a rollover detection system 10.1 comprises the rollover detection system 10 as illustrated in FIG. 2 and described hereinabove, and further comprises a lateral velocity sensor 42 that is operatively connected to the processor 26, and which is adapted to provide a measure of the lateral velocity of the vehicle 12 with respect to the ground surface, e.g. a road surface. The lateral velocity sensor 42 could be based upon any of various sensing technologies, including but not limited to wave or pulse based transmit and receive system based upon sound (or ultrasound), microwave, laser, radar, or other electromagnetic technology, e.g. by measuring speed responsive to a Doppler shift of an associated carrier wave; or an optical velocity sensor that relies upon the underlying spatial frequencies in an image of the ground surface. The lateral velocity sensor 42, for example, would be mounted on a downward or sideways facing surface of the vehicle, such as the undercarriage, under side of a side mirror, or lower vehicle body panel, for example, with the transmitter directed downward at the road surface such that the primary axis of the transmitted signal would be at some angle other than 0 degrees with respect to the vertical as viewed from the rear or the vehicle, for example, with the transmitter laterally tilted at about 45 degrees for a useful compromise between signal strength and sensor sensitivity. The receiver, for example, would be located some lateral distance away from the transmitter so as to receive a wave emitted from the transmitter and reflected from the road surface, for a normal vehicle driving height. Alternately, the transmitter could be oriented substantially parallel to the ground so as to measure the velocity relative to reflective surfaces proximate to and elevated from the road surface. The receiver could be located near the transmitter for ease in mounting, but possibly at the expense of a reduction in signal strength.

The measure of lateral velocity from the lateral velocity sensor 42 can be used to improve the discrimination of roll events by the rollover detection system 10.1. Many roll events—particularly tripped roll events—exhibit pre-roll motion that includes significant lateral vehicle velocity. As the vehicle 12 experiences lateral deceleration forces from the tires sliding laterally and possibly engaging some obstacle or ground feature, the lateral deceleration forces create the torque on the vehicle 12 about the longitudinal axis causing the vehicle 12 to roll, whereby the initial lateral translational kinetic energy associated with the initial lateral velocity is converted to rotational kinetic energy and potential energy. In accordance with the conservation of energy, absent other roll inducing forces—e.g. vertical forces that might convert the longitudinal translational kinetic energy associated with the vehicle's forward velocity to rotational kinetic energy—the vehicle would not likely roll over responsive to a conversion of the lateral kinetic energy unless the lateral kinetic energy $$(\frac{1}{2}mass_{veh} * v^2)$$

is greater than the potential energy ($mass_{veh}*g*\Delta h$) associated with raising the vehicle center of gravity to the equilibrium height $\Delta h$ associated with the vehicle on two same-side wheels. Accordingly, a measure of vehicle lateral velocity or speed can provide an early indication of whether or not the vehicle has sufficient energy to roll over. If the vehicle lateral velocity is insufficient to cause a complete rollover (i.e. if $V \leq \sqrt{2g\Delta h}$), then the deployment of associated safety restraint actuators 30 can be delayed or inhibited, even for the most initially severe partial roll events.

For example, a vehicle 12 sliding laterally into a fixed curb with lateral impact velocity of 10 mph may likely not roll over, but instead, would be subject to a relatively large, but short-lived, lateral acceleration and roll rate lasting on the order of ½ second. However, a similar curb impact event with an initial lateral speed of at least 15 mph would likely result in a vehicle rollover with an associated occupant head closure time of about 100 to 150 ms after initial impact. A rollover decision criteria adapted to deploy the safety restraint actuators 30 prior to occupant head closure for the latter rollover event, would likely result in deployment of the safety restraint actuators 30 responsive to the former non-roll event if the rollover decision criteria were not otherwise responsive to vehicle lateral speed. If the vehicle lateral speed is known, then the deployment of all or some rollover restraints can be inhibited at an otherwise relatively early decision time that would be necessary to otherwise deploy the safety restraint actuators 30 prior to occupant head closure. The roll motion could continue to be monitored by the rollover detection system 10.1, and safety restraint actuators 30 could be deployed at later times if the conditions changed to those that would lead to a complete rollover.

In accordance with another embodiment of the rollover detection system 10.1, the associated measures algorithm 300.1 or the energy algorithm 300.2 could incorporate two or more different deployment thresholds, the selection of which would be dependent upon the lateral speed of the vehicle at or near the rollover algorithm entrance. The threshold could be a function of initial lateral velocity such that for lower initial lateral velocities, correspondingly larger thresholds for one or more rollover measures would be required to be exceeded in order for the associated safety restraint actuators 30 to be deployed.

The initial lateral velocity of the vehicle 12 does not necessarily account for all of the translational kinetic energy available to be transformed into rotational kinetic energy that would possibly lead to rollover. For example, a vehicle that is traveling forward has a longitudinal translational energy that can be converted into lateral kinetic energy, for example, if the vehicle 12 undergoes a spin on a slippery surface. If this vehicle simultaneously undergoes roll motion, then as the roll proceeds, the rotational kinetic energy and the rotation induced potential energy may increase without significantly depleting the kinetic energy associated with the initial lateral velocity of the vehicle 12.

In accordance with another embodiment, if the total translational kinetic energy—i.e. lateral plus longitudinal—is less than a threshold corresponding to the rotational potential energy at the roll equilibrium position of the vehicle 12, then the deployment of the associated safety restraint actuators 30 could be inhibited because there would be insufficient energy to cause the vehicle to completely roll over.

In accordance with another embodiment of the rollover detection system 10.1, the lateral velocity of the vehicle 12 is monitored during the initial stages of the event to determine if the current lateral kinetic energy plus rotational kinetic energy plus potential energy exceeds the energy required for vehicle rollover. Generally, the lateral velocity of the vehicle can be blended into the rollover algorithm to develop a new measure—or to enhance an existing measure—of roll likelihood, for example, that is a function of the sensed lateral speed in combination with one or more of the following vehicle dynamic signals: longitudinal roll rate, roll tilt angle, height above the road surface, lateral acceleration, vertical acceleration, steering wheel angle, vehicle forward speed, or yaw rate. Combining vehicle lateral velocity with any of these sensed vehicle state parameters can provide a measure that enhances the ability of a rollover algorithm to more quickly estimate or predict whether or not the vehicle will rollover.

For example, in accordance with an energy-based approach, a theoretical deployment threshold in the phase space of roll rate and roll angle could be of the form:

$$\text{function}(v_{lateral}) + \text{function}(\text{rollrate}), \text{ for example:}$$

$$C_1 * v_{lateral}^2 + (\omega_{roll}^2 + \sum_{time} \omega_{roll}) = C_2$$

where $C_1$ is a vehicle-specific constant, $v_{lateral}$ is the lateral speed of the vehicle, $\omega_{roll}$ is the roll rate of the vehicle, and $C_2$ is the potential energy required for rollover, which provides a measure roughly proportional to the total energy that may be available or is contributing to roll motion, i.e. the total of the lateral kinetic energy, the roll rotational kinetic energy, and the roll-angle-contributed potential energy. For purposes of comparison, the theoretical deployment threshold illustrated in FIG. 15 is given by the latter term of the above function, i.e.

$$(\omega_{roll}^2 + \sum_{time} \omega_{roll}).$$

Accordingly, the former term of the above function, i.e.

$$C_1 * v_{lateral}^2$$

can be interpreted as a threshold-lowering offset that is dependent upon lateral velocity. Specific threshold characteristics for a particular vehicle can be tailored using either test data or analysis to relate the particular threshold function to a minimum value that results in vehicle rollover.

In other embodiments, the measure of lateral velocity can be used to modify the deployment threshold function(s) of either the hereinabove described energy algorithm 300.2 or the hereinabove described measures algorithm 300.1.

For example, referring to FIG. 17, the roll rate—roll angle deployment threshold of the energy algorithm 300.2 can be adjusted lower responsive to the measure of lateral velocity, as indicated by the dashed line in FIG. 17. For example, the entire threshold curve might be shifted downward by a roll rate that is dependent upon the measure of lateral velocity, in accordance with the associated lateral translational kinetic energy that is available to be converted into roll motion.

As another example, referring to FIG. 18, a threshold for a rollover measure that increases in magnitude for increasing roll probability—e.g. the threshold function of the measures algorithm 300.1—can be adjusted by a multiplicative factor that is a function of the magnitude of lateral velocity. For example, a velocity magnitude, $V_1$, could be chosen for which the nominal rollover deployment threshold is not modified (threshold multiplier of 1). For lower speeds the threshold is raised by a threshold multiplier factor (greater than 1), and for higher speeds the threshold is lowered by a threshold multiplier factor (between 1 and 0), wherein the multiplier factor is a function of the measure of lateral speed. Alternately, instead of modifying the threshold in this manner, the particular rollover measure could be changed by adding an appropriate function of lateral velocity so as to achieve an equivalent result.

The measure of vehicle lateral velocity can be either directly measured—as described hereinabove—or indirectly estimated. The estimation of lateral velocity can be based upon measurements from sensors that would already be incorporated in the vehicle, e.g. for vehicle stability or non-roll crash sensing, thereby precluding the need for a lateral velocity sensor to provide a direct measure of lateral velocity.

For example, a measure of lateral velocity can be estimated using a measurement of lateral acceleration from a lateral accelerometer, together with either a measurement of yaw rate from a yaw rate sensor, or a measurement of vehicle forward speed and steering wheel angle respectively from a respective vehicle speed sensor and a steering wheel angle or front wheel angle sensor. The acceleration measurement from the lateral accelerometer can be integrated as a function of time to obtain a measure of lateral speed, and the output of the yaw rate sensor (or forward velocity sensor) combined with the steering wheel or front wheel angle sensor can be used to correct the integrated lateral speed responsive to measured yaw rotational motion. For example, the lateral speed can be estimated by integrating (or discretely summing) the measured lateral acceleration with respect to time after subtracting the centripetal acceleration derived from combining the yaw rate sensor (or forward velocity sensor) and the steering angle sensor as follows:

$$v_{lateral} = \int (A_{lateral} - \omega_{yaw}^2 * R) dt$$

or $$v_{lateral} = \int (A_{lateral} - v_{forward}^2 / R) dt$$

where $v_{lateral}$ is the calculated lateral speed of the vehicle; $\omega_{yaw}$ is the measured yaw rate of the vehicle; R is the vehicle turn radius as derived from the steering wheel angle, front tire angle sensor, or separate measures of wheel speed from separate front wheel speed sensors; and $v_{forward}$ is the forward vehicle speed.

The input signals used in this calculation would be low pass filtered and compensated to remove offsets. A particular type of vehicle will have an associated maximum yaw rate, or forward velocity, that can occur for a given steering radius, whereby a higher forward velocity or yaw rate would result in lateral tire slippage and an associated lateral vehicle speed, for typical road/tire conditions. The centripetal acceleration correction based upon either the yaw rate and vehicle turn radius or the forward speed and the vehicle turn radius would be limited to a maximum vehicle-specific magnitude. For most vehicles with good tires on dry pavement (ideal conditions) the correction term, $$\omega_{yaw}^2 * R \text{ or } v_{forward}^2 / R,$$

would be limited to about ±0.8 g corresponding to the vehicle-specific maximum sustainable centripetal acceleration on typical dry, flat pavement. In real driving situations it may be possible to achieve higher centripetal accelerations, for example, if the driving terrain allowed the tires to dig into the driving surface. Notwithstanding that these conditions could produce a larger estimate of lateral velocity than experienced by the vehicle, these conditions are also much more conducive to generating an actual rollover event because the tires and rims are potentially able to cause substantially larger torque-inducing force on the vehicle. The calculation may require some damping term and/or conditions that allow for either only a triggered calculation of the lateral velocity, or an event driven reset of the estimated lateral velocity to zero, so as to preclude the adverse affect of an uncorrected offset when integrating lateral acceleration over a relatively long period of time.

The yaw rate sensor measures the rotation rate about a vertical axis of the vehicle 12. The description hereinabove assumed that the forward vehicle velocity and yaw rate are related by a simple constant: $v_{forward} = \omega_{yaw} * R$, which is generally true under conditions for which the tires do not slip on the driving surface. Under conditions for which the vehicle 12 tires are slipping, the vehicle 12 may have some rotational motion about a vertical axis other than the center of the commanded turn radius, in which case the product of the yaw rate and the turn radius could be expected to exceed the forward velocity. In a rollover detection system 10.1 incorporating sensors for forward velocity $v_{forward}$, yaw rate $\omega_{yaw}$ and turn radius R, all three of these signals could be utilized to obtain both a measure of lateral velocity and a measure of vehicle spin rate as follows:

$$v_{lateral} = \int (A_{lateral} - v_{forward}^2 / R) dt,$$

where $v_{forward}^2 / R$ is bounded by $\pm A_{centripetal \, MAX}$ $$spin \; rate = \omega_{yaw} - v_{forward} / R,$$

where $v_{forward} / R$ is bounded by $\pm A_{centripetal \, MAX} / v_{forward}$ Vehicle spin rate could be important because if a vehicle is primarily spinning about a vertical axis near the mounting location of the lateral accelerometer, then, especially for low friction road condition (e.g. icy roads), the lateral accelerometer may not adequately detect the change in lateral velocity of the vehicle. Accordingly, the lateral velocity estimate can be further corrected as follows:

$$v_{lateral} = \int (A_{lateral} - v_{forward}^2 / R) dt + v_{forward} * \cos\left(\int spin \; rate \cdot dt\right)$$

wherein the added correction term integrates the estimated vehicle spin rate to obtain a vehicle spin angle, which is then used to determine an estimate of the projection of the forward vehicle speed onto lateral motion that might be otherwise be undetected by the lateral accelerometer.

The parameters of the herein-described roll discrimination algorithm are derived from associated test data, and may require adjustment if applied to other types of vehicles than for those for which the parameters were derived, wherein a criteria for the adjustment is, for example, robust and early detection of rollover events while also avoiding, to the extent possible, falsely discriminating non-rollover events as rollover events. The particular values for various parameters described herein are not considered to be limiting, and, for example, may be different for different types of vehicles, which may have different susceptibilities to rollover. For example, a vehicle with a relatively high center of gravity or a relatively narrow wheel-base—e.g. a sport-utility vehicle—would be more susceptible to rollover than a vehicle having a relatively low center of gravity or a relatively wide wheel-base—e.g. a passenger sedan. Furthermore, the rollover detection system 10 as could also be adapted to sense pitchover events, i.e. about the local Y-axis of the vehicle, by providing an associated longitudinal accelerometer and a pitch rate sensor.

The lateral velocity sensor—which provides for a direct measurement of the lateral velocity of the vehicle—and the lateral velocity estimation algorithm described herein, provide means for measuring or estimating lateral velocity that are substantially more accurate that might otherwise be inferred by either integrating only a measure of lateral acceleration, or by using a measure of longitudinal velocity of the vehicle, and thereby provides for improved discrimination of rollover events.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof.

I claim:

1. A system for detecting a rollover condition of a vehicle, comprising:
   a. a roll angular velocity sensor operatively coupled to the vehicle, wherein said roll angular velocity sensor is adapted to measure a roll rate of the vehicle about a roll axis, and said roll axis is substantially aligned with a longitudinal axis of the vehicle;
   b. a lateral velocity sensor operatively coupled to the vehicle, wherein said lateral velocity sensor is responsive to a velocity of the vehicle in a direction that is substantially lateral to said vehicle, and said lateral velocity sensor is selected from an ultrasonic sensor, a microwave sensor, a radar sensor, and an optical velocity sensor; and
   c. a processor operatively coupled to said roll angular velocity sensor and to said lateral velocity sensor, wherein said processor is adapted to generate a signal for controlling a safety restraint system, said signal for controlling said safety restraint system is responsive to a signal from said roll angular velocity sensor and to a signal from said lateral velocity sensor, said signal for controlling said safety restraint system is responsive to a deployment threshold, said deployment threshold is responsive to said measure of lateral velocity, said processor is adapted to determine a measure of roll angle by integrating said signal from said roll angular velocity sensor, and said signal for controlling said safety restraint system is further responsive to said measure of roll angle.

2. A system for detecting a rollover condition of a vehicle, comprising
   a. a roll angular velocity sensor operatively coupled to the vehicle, wherein said roll angular velocity sensor is adapted to measure a roll rate of the vehicle about a roll axis, and said roll axis is substantially aligned with a longitudinal axis of the vehicle;
   b. a lateral velocity sensor operatively coupled to the vehicle, wherein said lateral velocity sensor is responsive to a velocity of the vehicle in a direction that is substantially lateral to said vehicle, and said lateral velocity sensor is selected from an ultrasonic sensor, a microwave sensor, a radar sensor, and an optical velocity sensor; and
   c. a processor operatively coupled to said roll angular velocity sensor and to said lateral velocity sensor, wherein said processor is adapted to generate a signal for controlling a safety restraint system, said signal for controlling said safety restraint system is responsive to a signal from said roll annular velocity sensor and to a signal from said lateral velocity sensor, said signal for controlling said safety restraint system is responsive to a deployment threshold, and said deployment threshold is responsive to said measure of lateral velocity; and
   d. a longitudinal velocity sensor operatively coupled to the vehicle, wherein said longitudinal velocity sensor is responsive to a velocity of the vehicle in a direction that is substantially along said longitudinal axis of the vehicle, and said signal for controlling said safety restraint system is further responsive to a signal from said longitudinal velocity sensor.

3. A system for detecting a rollover condition of a vehicle as recited in claim 1, further comprising an accelerometer operatively coupled to the vehicle, wherein said accelerometer is adapted to measure an acceleration of the vehicle substantially in said lateral direction, and said signal for controlling said safety restraint system is further responsive to a signal from said accelerometer.

4. A method of providing for detecting a rollover condition of a vehicle, comprising:
   a. providing for acquiring a measure of roll angular velocity of the vehicle about a roll axis, wherein said roll axis is substantially aligned with a longitudinal axis of the vehicle;
   b. providing for acquiring a measure of lateral velocity of the vehicle, wherein said measure of lateral velocity is directly representative of a lateral velocity of the vehicle;
   c. providing for generating a signal for controlling a safety restraint system, wherein said signal for controlling said safety restraint system is responsive to said measure of roll angular velocity and to said measure of lateral velocity;
   d. providing for comparing a third measure with a first threshold, wherein said third measure is responsive to said measure of lateral velocity; and
   e. providing for delaying or inhibiting deployment of said safety restraint system if said third measure is less than said first threshold.

5. A method of providing for detecting a rollover condition of a vehicle, comprising:
   a. providing for acquiring a measure of roll angular velocity of the vehicle about a roll axis, wherein said roll axis is substantially aligned with a longitudinal axis of the vehicle;
   b. providing for acquiring a measure of lateral velocity of the vehicle, wherein said measure of lateral velocity is directly representative of a lateral velocity of the vehicle;
   c. providing for generating a signal for controlling a safety restraint system, wherein said signal for controlling said safety restraint system is responsive to said measure of roll angular velocity and to said measure of lateral velocity;
   d. providing for acquiring a measure of longitudinal velocity of the vehicle;
   e. providing for determining a measure of translational velocity of the vehicle, wherein said measure of translational velocity is responsive to said measure of longitudinal velocity and to said measure of lateral velocity;

f. providing for comparing a fourth measure with a second threshold, wherein said fourth measure is responsive to said measure of translational velocity; and g. providing for inhibiting deployment of said safety restraint system if said fourth measure is less than said second threshold.

6. A method of providing for detecting a rollover condition of a vehicle, comprising:

a. providing for acquiring a measure of roll angular velocity of the vehicle about a roll axis, wherein said roll axis is substantially aligned with a longitudinal axis of the vehicle;

b. providing for acquiring a measure of lateral velocity of the vehicle, wherein said measure of lateral velocity is directly representative of a lateral velocity of the vehicle;

c. providing for generating a signal for controlling a safety restraint system, wherein said signal for controlling said safety restraint system is responsive to said measure of roll angular velocity and to said measure of lateral velocity;

d. providing for determining or acquiring a measure of roll angle from said measure of roll angular velocity;

e. providing for determining a threshold function in a phase space of said measure of roll angular velocity and said measure of roll angle;

f. providing for modifying said threshold function responsive to said measure of lateral velocity; and g. providing for comparing a measure in phase space with said threshold function, where said measure in phase space comprises a combination of said measure of roll angular velocity and said measure of roll angle, wherein said signal for controlling said safety restraint system is responsive to the operation of comparing said measure in phase space with said threshold function.

7. A method of providing for detecting a rollover condition of a vehicle as recited in claim 6, wherein said threshold function comprises either a function in phase space, a piecewise function in phase space, or a table lookup in phase space.

8. A method of providing for detecting a rollover condition of a vehicle as recited in claim 6, wherein the operation of modifying said threshold function comprises determining a roll angular velocity offset responsive to said measure of lateral velocity, and subtracting said roll angular velocity offset from said threshold function.

9. A method of providing for detecting a rollover condition of a vehicle, comprising:

a. providing for acquiring a measure of roll angular velocity of the vehicle about a roll axis, wherein said roll axis is substantially aligned with a longitudinal axis of the vehicle;

b. providing for acquiring a measure of lateral velocity of the vehicle, wherein said measure of lateral velocity is directly representative of a lateral velocity of the vehicle;

c. providing for generating a signal for controlling a safety restraint system, wherein said signal for controlling said safety restraint system is responsive to said measure of roll angular velocity and to said measure of lateral velocity;

d. generating a fifth measure responsive to said measure of lateral velocity and to at least one of a measure selected from the group comprising said measure of roll angular velocity, a measure of roll angle of the vehicle, a measure of lateral acceleration of the vehicle, a measure of vertical acceleration of the vehicle, a measure of steering wheel angle of the vehicle, a measure of longitudinal speed of the vehicle, and a measure of yaw rate of the vehicle;

e. comparing said fifth measure with a third threshold; and f. controlling said safety restraint system responsive to the operation of comparing said fifth measure with said third threshold.

10. A method of providing for detecting a rollover condition of a vehicle as recited in claim 9, wherein said fifth measure comprises a combination of a lateral translational kinetic energy measure and a measure responsive to said roll rate measure, wherein said lateral translational kinetic energy measure is responsive to said measure of lateral velocity, and said measure responsive to said roll rate measure is responsive to at least one of a rotational kinetic energy measure and a measure of roll angle, wherein said rotational kinetic energy measure is responsive to said measure of roll angular velocity, and said measure of roll angle is responsive to an integration of said measure of angular velocity.

11. A method of providing for detecting a rollover condition of a vehicle, comprising:

a. providing for acquiring a measure of roll angular velocity of the vehicle about a roll axis, wherein said roll axis is substantially aligned with a longitudinal axis of the vehicle;

b. providing for acquiring a measure of lateral velocity of the vehicle, wherein said measure of lateral velocity is directly representative of a lateral velocity of the vehicle; and c. providing for generating a signal for controlling a safety restraint system, wherein said signal for controlling said safety restraint system is responsive to said measure of roll angular velocity and to said measure of lateral velocity, wherein the operation of providing for generating said signal for controlling said safety restraint system comprises:

i. providing for acquiring a measure of lateral acceleration of the vehicle;

ii. providing for determining a figure of merit responsive to said measure of lateral acceleration and said measure of roll angular velocity;

iii. providing for determining a figure of merit threshold responsive to said measure of lateral velocity; and iv. providing for detecting the rollover condition by comparing said figure of merit with said figure of merit threshold.

12. A method of providing for detecting a rollover condition of a vehicle as recited in claim 11, wherein the operation of providing for determining a figure of merit threshold comprises multiplying a first figure of merit threshold by a threshold multiplier, and said threshold multiplier is responsive to said measure of lateral velocity.

13. A method of providing for detecting a rollover condition of a vehicle as recited in claim 11, wherein the operation of providing for determining a figure of merit threshold comprises adding an offset to a first figure of merit threshold, and said offset is responsive to said measure of lateral velocity.

14. A method of providing for detecting a rollover condition of a vehicle, comprising:

a. providing for acquiring a measure of roll angular velocity of the vehicle about a roll axis, wherein said roll axis is substantially aligned with a longitudinal axis of the vehicle;

b. providing for acquiring a measure of lateral acceleration of the vehicle;
c. providing for acquiring at least one of a measure of longitudinal velocity of the vehicle and a measure of yaw angular velocity about a yaw axis;
d. providing for determining a measure of a turn radius of the vehicle;
e. providing for determining a measure of lateral velocity of the vehicle responsive to said measure of lateral acceleration, to said measure of said turn radius, and to at least one of said measure of longitudinal velocity and said measure of yaw angular velocity; and
f. providing for generating a signal for controlling said safety restraint system, wherein said signal for controlling said safety restraint system is responsive to said measure of roll angular velocity and to said measure of lateral velocity.

15. A method of providing for detecting a rollover condition of a vehicle as recited in claim 14, wherein the operation of determining a measure of turn radius comprises:
a. acquiring at least one of a measure of steering wheel angle, a measure of a front tire angle, and measures of forward velocity from separate front wheel speed sensors; and
b. determining said measure of turn radius responsive to said at least one of a measure of steering wheel angle, a measure of a front tire angle, and measures of forward velocity from separate front wheel speed sensors.

16. A method of providing for detecting a rollover condition of a vehicle as recited in claim 14, wherein the operation of providing for determining a measure of lateral velocity comprises integrating a fourth measure, wherein said fourth measure is responsive to a difference between said measure of latent acceleration and a measure of centripetal acceleration, and said measure of centripetal acceleration is responsive to said turn radius, and to at least one of said measure of yaw angular velocity and said measure of longitudinal velocity.

17. A method of providing for detecting a rollover condition of a vehicle as recited in claim 16, further comprising limiting a magnitude of said measure of centripetal acceleration by a centripetal acceleration threshold.

18. A method of providing for detecting a rollover condition of a vehicle as recited in claim 16, wherein said measure of centripetal acceleration comprises a product of said measure of yaw angular velocity and said turn radius.

19. A method of providing for detecting a rollover condition of a vehicle as recited in claim 16, wherein said measure of centripetal acceleration comprises said measure of longitudinal velocity divided by said turn radius.

20. A method of providing for detecting a rollover condition of a vehicle as recited in claim 16, wherein the operation of providing for determining a measure of lateral velocity further comprises:
a. determining a measure of spin rate, wherein said measure of spin rate is responsive to said measure of yaw angular velocity, and to a fifth measure, wherein said fifth measure is responsive to said measure of longitudinal velocity, and to said turn radius;
b. integrating said measure of spin rate so as to generate a measure of spin angle;
c. generating a sixth measure by multiplying said measure of longitudinal velocity times said spin angle; and
d. generating a modified measure of lateral velocity by adding said sixth measure to said measure of lateral velocity.

21. A method of providing for detecting a rollover condition of a vehicle as recited in claim 20, further comprising limiting said fifth measure responsive to a centripetal acceleration threshold and to said measure of longitudinal velocity.

22. A system for detecting a rollover condition of a vehicle as recited in claim 1, wherein said deployment threshold is shifted by an offset responsive to said measure of lateral velocity.

23. A system for detecting a rollover condition of a vehicle as recited in claim 1, wherein said deployment threshold is scaled by a factor responsive to said measure of lateral velocity.

24. A system for detecting a rollover condition of a vehicle as recited in claim 2, further comprising an accelerator operatively coupled to the vehicle, wherein said accelerometer is adapted to measure an acceleration of the vehicle substantially in said lateral direction, and said signal for controlling said safety restraint system is further responsive to a signal from said accelerometer.

25. A system for detecting a rollover condition of a vehicle as recited in claim 2, wherein said deployment threshold is shifted by an offset responsive to said measure of lateral velocity.

26. A system for detecting a rollover condition of a vehicle as recited in claim 2, wherein said deployment threshold is scaled by a factor responsive to said measure of lateral velocity.

* * * * *